United States Patent
Lee et al.

(10) Patent No.: US 7,742,117 B2
(45) Date of Patent: Jun. 22, 2010

(54) LIQUID CRYSTAL DISPLAY PANEL

(75) Inventors: Hyeok-Jin Lee, Seongnam-si (KR);
Hee-Seop Kim, Hwaseong-si (KR);
Byoung-Sun Na, Suwon-si (KR);
LuJian Gang, Suwon-si (KR);
Hwa-Sung Woo, Suwon-si (KR);
Ji-Hyun Kwon, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 247 days.

(21) Appl. No.: 12/021,731

(22) Filed: Jan. 29, 2008

(65) Prior Publication Data
US 2008/0180590 A1 Jul. 31, 2008

(30) Foreign Application Priority Data
Jan. 29, 2007 (KR) .................. 10-2007-0009021

(51) Int. Cl.
*G02F 1/1343* (2006.01)
(52) U.S. Cl. .................. 349/39; 349/139; 349/141; 438/30
(58) Field of Classification Search ......... 349/139–148, 349/39; 257/E21.002; 438/30
See application file for complete search history.

(56) References Cited

U.S. PATENT DOCUMENTS

| 7,403,254 | B2 * | 7/2008 | Lee et al. ................ 349/141 |
| 2006/0001809 | A1 | 1/2006 | Lee et al. |
| 2006/0061722 | A1 * | 3/2006 | Jun ........................ 349/139 |
| 2008/0186439 | A1 * | 8/2008 | Kwon et al. ............. 349/139 |
| 2009/0096950 | A1 * | 4/2009 | Kim et al. ................ 349/43 |

FOREIGN PATENT DOCUMENTS

| KR | 1020020088092 | 11/2002 |
| KR | 1020050123357 | 12/2005 |

* cited by examiner

*Primary Examiner*—Ellen Kim
(74) *Attorney, Agent, or Firm*—F. Chau & Associates, LLC

(57) ABSTRACT

A liquid crystal display (LCD) panel includes: a first base substrate; a plurality of gate lines and a plurality of data lines disposed on the first base substrate and crossing each other; a pixel electrode pattern disposed on the first base substrate; a storage pattern disposed on the first base substrate, the storage pattern being positioned between consecutive gate lines and substantially in parallel with the gate lines; a second base substrate; a common electrode disposed on the second base substrate and alternately positioned with the pixel electrode; and a liquid crystal layer disposed between the first and second base substrates.

18 Claims, 24 Drawing Sheets

US 7,742,117 B2

LIQUID CRYSTAL DISPLAY PANEL

CROSS-REFERENCE TO RELATED APPLICATION

This application claims priority to Korean Patent Application No. 10-2007-0009021, filed on Jan. 29, 2007, the disclosure of which is incorporated by reference herein in its entirety.

BACKGROUND OF THE INVENTION

1. Technical Field

The present invention relates to a liquid crystal display (LCD) panel and, more particularly, to an LCD panel capable of preventing light leakage and texture generation.

2. Discussion of the Related Art

A liquid crystal display (LCD) device displays an image by controlling light transmittance of respective liquid crystal cells arranged in a matrix form on an LCD panel according to video signals. To obtain a wide-viewing angle, the LCD device may employ, for example, a patterned vertical alignment (PVA) mode, an in-plane switching (IPS) mode, or a plane-to-line switching (PLS) mode.

In the PVA mode, a plurality of slits is formed on common electrodes and pixel electrodes of upper and lower substrates, and liquid crystal molecules located between the substrates are driven symmetrically with respect to the slits by fringe electric fields generated by the slits, thus forming a multi-domain structure.

In the IPS mode, a liquid crystal is driven by a horizontal electric field generated between a pixel electrode and a common electrode arranged in parallel on a lower substrate. In the IPS mode, the electrodes are formed on one substrate so that liquid crystal molecules are rotated in the plane of the same substrate and, as a result, an optical axis of a liquid crystal layer is rotated relative to the substrate.

In the PLS mode, a common electrode and a pixel electrode are provided in each pixel area with an insulating layer interposed therebetween to form a fringe electric field thereby causing all liquid crystal molecules filled between upper and lower substrates to be operated in the respective pixel areas.

However, in the IPS and PLS modes, residual images are generated and light transmittance is lowered since the electric fields are generated by the electrodes formed on one substrate. Moreover, in the PVA mode, the aperture ratio is low.

As an alternative to IPS, PLS and PVA, a dual field switching (DFS) mode has been proposed. In the DFS mode, a liquid crystal is aligned horizontally or vertically to an electric field generated between electric patterns of upper and lower substrates. The DFS mode improves side visibility and light transmittance by using fringe electric fields generated between pixel and common electrodes patterned on upper and lower substrates.

However, in an LCD device employing the DFS mode, a step height is formed by a pixel electrode and a storage electrode, which results in light leakage. In addition, a black brightness is increased by the light leakage thereby causing the capacity of a storage capacitor to be decreased. Moreover, since it is difficult to control the liquid crystal arranged in a position where the pixel electrode and a drain electrode are connected, an undesirable texture is generated.

Accordingly, there exists a need for an LCD panel that is capable of preventing light leakage and texture generation.

SUMMARY OF THE INVENTION

In an exemplary embodiment of the present invention, a liquid crystal display (LCD) panel, includes: a first base substrate; a plurality of gate lines and a plurality of data lines disposed on the first base substrate and crossing each other; a pixel electrode pattern disposed on the first base substrate, the pixel electrode pattern comprising, a first electrode connection portion and a second connection portion arranged in parallel with each other, a first linear pixel electrode and a second linear pixel electrode arranged between the first electrode connection portion and the second electrode connection portion, a central electrode arranged between the first linear pixel electrode and the second linear pixel electrode, and a central portion connected to the central electrode, wherein the first linear pixel electrode and the second linear pixel electrode are inclined in a different direction from each other with respect to the gate lines, and the central electrode is formed in a substantially triangular shape; a storage pattern disposed on the first base substrate, the storage pattern being positioned between consecutive gate lines and substantially in parallel with the gate lines, wherein the storage pattern is a lower electrode of a storage capacitor; a second base substrate; a common electrode disposed on the second base substrate and alternately positioned with the pixel electrode; and a liquid crystal layer disposed between the first and second substrates.

The storage pattern includes a first storage electrode and a second storage electrode formed at positions corresponding to the first and second electrode connection portions, respectively, and a storage line formed at a position corresponding to the central portion of the pixel electrode pattern and connected to the first storage electrode and the second storage electrode.

The storage pattern includes a first storage electrode and a second storage electrode formed at positions corresponding to the first and second electrode connection portions, respectively, and a central storage electrode formed at an intersection between the first storage electrode and the storage line, wherein the central storage electrode is formed in a linear shape.

The central storage electrode is formed in a substantially quadrangular shape.

The central storage electrode is formed in a substantially rectangular shape.

The central storage electrode is formed about 4 μm apart from the central electrode.

The central storage electrode is formed in a substantially triangular shape.

The first and second storage electrodes are formed to have substantially the same or wider widths as or than the first and second electrode connection portions, respectively.

The first and second linear pixel electrodes are formed obliquely with respect to the central portion of the pixel electrode pattern.

The pixel electrode pattern is formed to overlap the TFT and includes a texture prevention portion connected to the first and second electrode connection portions.

The texture prevention portion is formed in a substantially triangular shape, wherein one side of the texture prevention portion is formed parallel to the second linear pixel electrode and another side of the texture prevention portion is formed parallel to the gate line.

The texture prevention portion is connected to the TFT.

The storage line is formed of the same material as the gate line.

The storage line is formed on the same plane as the gate line.

The pixel electrode pattern is formed of a transparent conductive material.

The second substrate includes a transmissive region and a blocking region, a black matrix provided in the blocking region, and a color filter provided in the transmissive region.

The first linear pixel electrode is provided in plurality and the plurality of first linear pixel electrodes are spaced at regular intervals, and the second linear pixel electrode is provided in plurality and the plurality of second linear pixel electrodes are spaced at regular intervals.

In an exemplary embodiment of the present invention, a method of manufacturing a thin film transistor (TFT) substrate in a liquid crystal display (LCD) panel, includes: forming a gate metal pattern including a gate line, a gate electrode and a storage pattern on a substrate; forming a gate insulating layer on the gate metal pattern and a semiconductor pattern including an activation layer and an ohmic contact layer on the gate insulating layer; forming a data metal pattern including a data line, a source electrode and a drain electrode on the semiconductor pattern and the gate insulating layer, and removing the ohmic contact layer between the source electrode and drain electrode to expose the activation layer; forming a passivation layer on the data metal pattern and the gate insulating layer, and forming a contact hole in the passivation layer to expose the drain electrode; and forming a pixel electrode pattern on the passivation layer, the pixel electrode pattern including a texture prevention portion connected to the drain electrode via the contact hole.

BRIEF DESCRIPTION OF THE DRAWINGS

The above and other features of the present invention will become more apparent by describing in detail exemplary embodiments thereof with reference to the attached drawings, in which.

DESCRIPTION OF EXEMPLARY EMBODIMENTS

The present invention is described more fully hereinafter with reference to the accompanying drawings, in which exemplary embodiments of the invention are shown. The present invention may, however, be embodied in many different forms and should not be construed as limited to the embodiments set forth herein.

Figure 1:
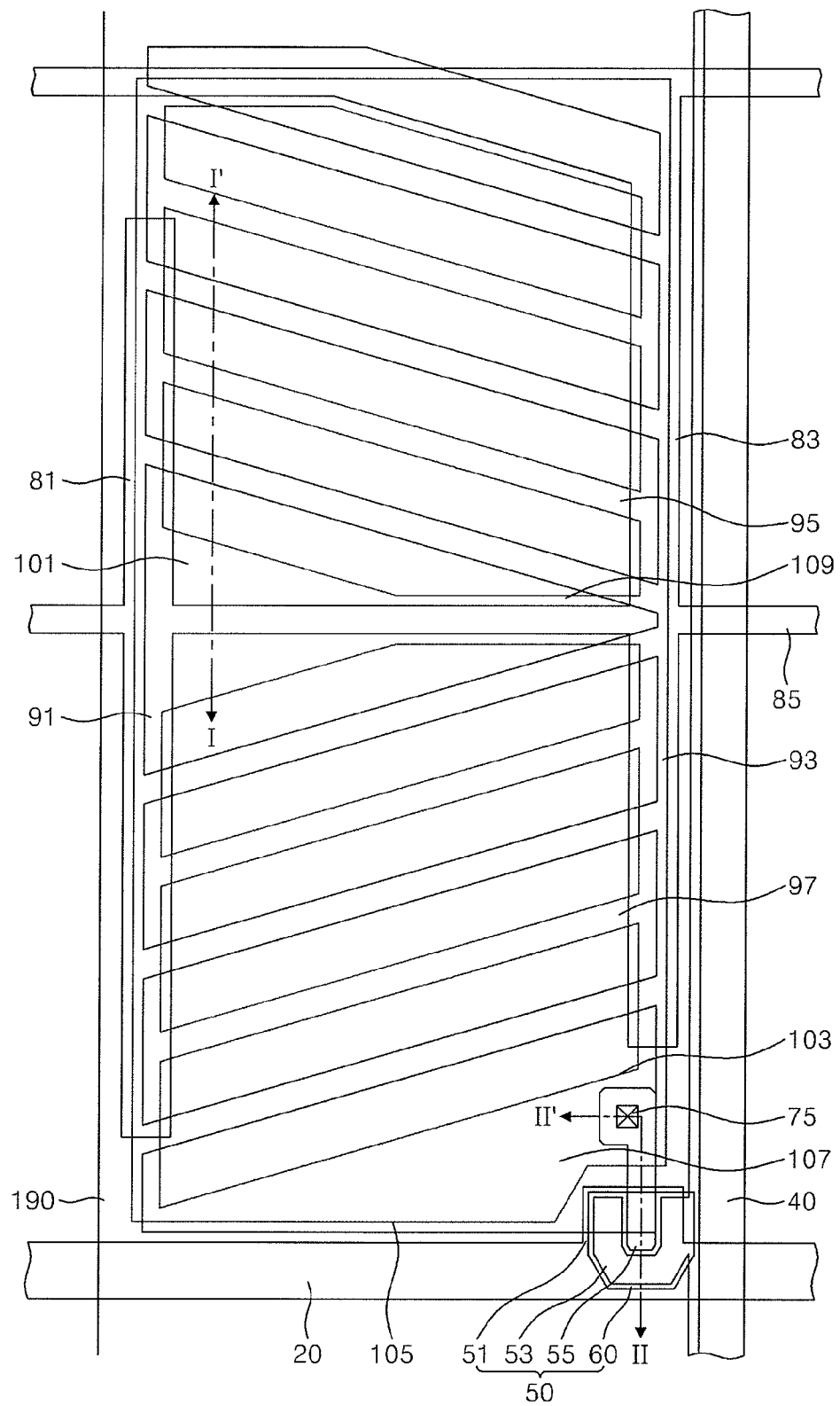
FIG. 1 is a plan view showing a liquid crystal display (LCD) panel in accordance with an exemplary embodiment of the present invention.
Figure 2A:
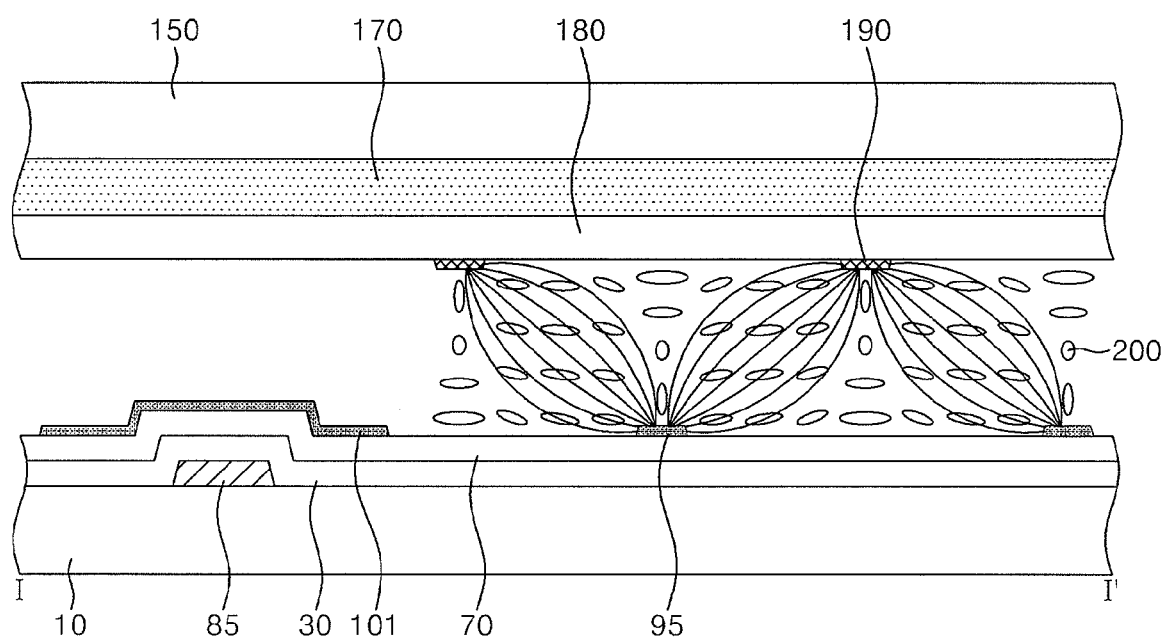
FIG. 2A is a cross-sectional view of the LCD panel shown in FIG. 1 taken along line I-I'.
Figure 2B:
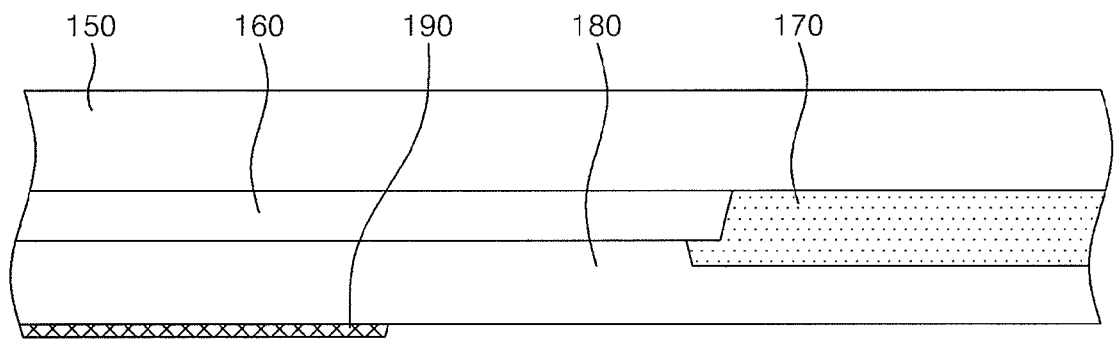
FIG. 2B is a cross-sectional view of the LCD panel shown in FIG. 1 taken along line II-II'.
Figure 2B:
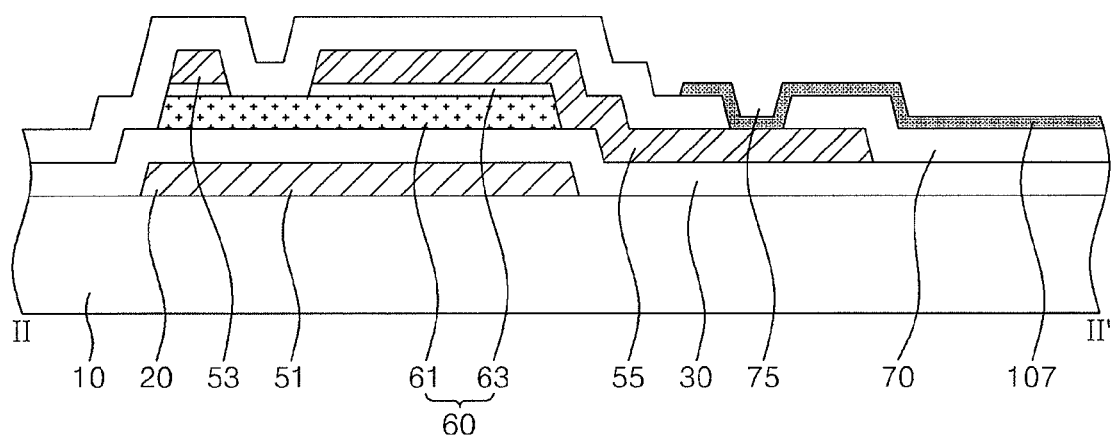

FIG. 1 is a plan view showing a liquid crystal display (LCD) panel in accordance with an exemplary embodiment of the present invention, FIG. 2A is a cross-sectional view of the LCD panel shown in FIG. 1 taken along line I-I', and FIG. 2B is a cross-sectional view of the LCD panel shown in FIG. 1 taken along line II-II'.

Referring to FIGS. 1, 2A, and 2B, an LCD panel includes a thin film transistor (TFT) substrate, an opposing substrate, and a liquid crystal 200 disposed between the TFT substrate and the opposing substrate.

The TFT substrate includes a first substrate 10, a gate line 20, a data line 40, a gate insulating layer 30, a TFT 50, a passivation layer 70, a pixel electrode pattern, and a storage pattern.

The first substrate 10 includes a plurality of pixels arranged in a matrix form and has a transmissive region for transmitting light emitted from a backlight assembly (not shown), and a blocking region for blocking the light. It is desirable that the first substrate 10 be formed of an insulating material such as glass or plastic.

The gate line 20 is formed on the blocking region of the first substrate 10. The gate line 20 is connected to a gate electrode 51 of the TFT 50 and thereby supplies a gate signal to the gate electrode 51 of the TFT 50. The gate line 20 may be formed of a metal material in a single layer or in a multi-layer thereof. The metal material used in the formation of the gate line 20 may include molybdenum (Mo), niobium (Nb), copper (Cu), aluminum (Al), chromium (Cr), silver (Ag), tungsten (W), or an alloy thereof.

The gate insulating layer 30 is formed on the gate line 20. The gate insulating layer 30 insulates a gate metal pattern including the gate line 20, the gate electrode 51 and the storage pattern from a data metal pattern including the data line 40, a source electrode 53 and a drain electrode 55.

The data line 40 supplies a pixel voltage signal to the source electrode 53 of the TFT 50. The data line 40 is formed to cross the gate line 20 with the gate insulating layer 30 interposed therebetween.

The TFT 50 allows the pixel voltage signal of the data line 40 to be charged to the pixel electrode pattern and maintained in response to a gate signal of the gate line 20. The TFT 50 includes the gate electrode 51 connected to the gate line 20, the source electrode 53 connected to the data line 40 and overlapping a portion of the drain electrode 55, and the drain electrode 55 facing the source electrode 53 and connected to the pixel electrode pattern.

Moreover, the TFT 50 includes a semiconductor pattern 60 overlapping the gate electrode 51 with the gate insulating layer 30 interposed therebetween and forming a channel between the source electrode 53 and drain electrode 55.

The semiconductor pattern 60 includes an activation layer 61 formed to overlap the gate electrode 51 with the gate insulating layer 30 interposed therebetween. The semiconductor pattern 60 further includes an ohmic contact layer 63 formed on the activation layer 61 and providing ohmic contact between the data line 40 and the source and drain electrodes 53 and 55.

The passivation layer 70 is formed on the data line 40 and the TFT 50 to protect the same. The passivation layer 70 may be formed of an inorganic material.

Figure 3:
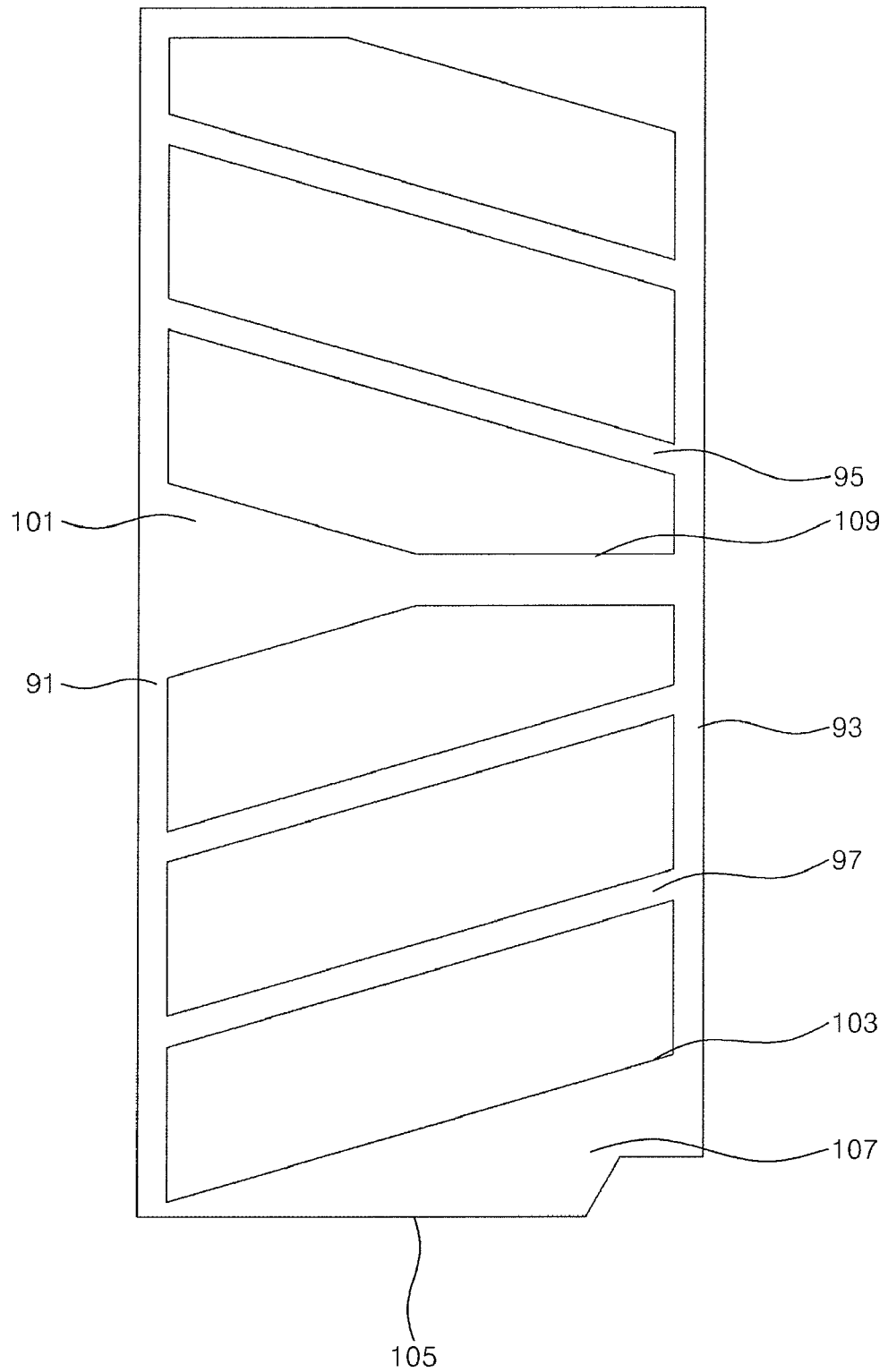
FIG. 3 is a plan view showing a pixel electrode pattern of the LCD panel shown in FIG. 1 in accordance with an exemplary embodiment of the present invention.

FIG. 3 is a plan view showing the pixel electrode pattern of the LCD panel shown in FIG. 1 in accordance with an exemplary embodiment of the present invention.

As shown in FIG. 3, the pixel electrode pattern includes a central portion 109, linear pixel electrodes 95 and 97, first and second electrode connection portions 91 and 93, a central electrode 101, and a texture prevention portion 107. The pixel electrode pattern is formed on the passivation layer 70. Moreover, the pixel electrode pattern is formed of a transparent conductive material such as indium tin oxide (ITO), tin oxide (TO), indium zinc oxide (IZO), and indium tin zinc oxide (ITZO).

The central portion 109 is formed in the center of the transmissive region parallel to the gate line 20.

The linear pixel electrodes 95 and 97 include a plurality of first and second linear pixel electrodes 95 and 97 formed obliquely and symmetrically with respect to the central portion 109.

The first and second electrode connection portions 91 and 93 are formed in the blocking region parallel to the data line 40. The first and second electrode connection portions 91 and 93 are connected to the plurality of first and second linear pixel electrodes 95 and 97. The first and second electrode connection portions 91 and 93 are connected to the central portion 109. In other words, the first electrode connection portion 91 is connected to the left side of the central portion 109 and the second electrode connection portion 93 is connected to the right side of the central portion 109. Upper and lower ends of the second electrode connection portion 93 are connected to upper and lower ends of the first electrode connection portion 91. Moreover, the lower ends of the first and second electrode connection portions 91 and 93 are connected by the texture prevention portion 107.

The central electrode 101 is formed at an intersection between the first electrode connection portion 91 and the central portion 109. The central electrode 101 is formed in the shape of a triangle.

The texture prevention portion 107 is connected to the lower ends of the first and second electrode connection portions 91 and 93. The texture prevention portion 107 is generally formed in the shape of a triangle. In particular, one side 103 of the texture prevention portion 107 is formed parallel to the second linear pixel electrode 97 and the other side 105 of the texture prevention portion 107 is formed parallel to the gate line 20. With such a structure in that the one side 103 of the texture prevention portion 107 is formed parallel to the second linear pixel electrode 97, a fringe electric field is generated constantly, thus enabling control of the liquid crystal 200. Accordingly, the generation of texture on the LCD panel can be prevented. The texture prevention portion 107 is connected to the drain electrode 55 exposed by a contact hole 75 penetrating the passivation layer 70.

Figure 4A:
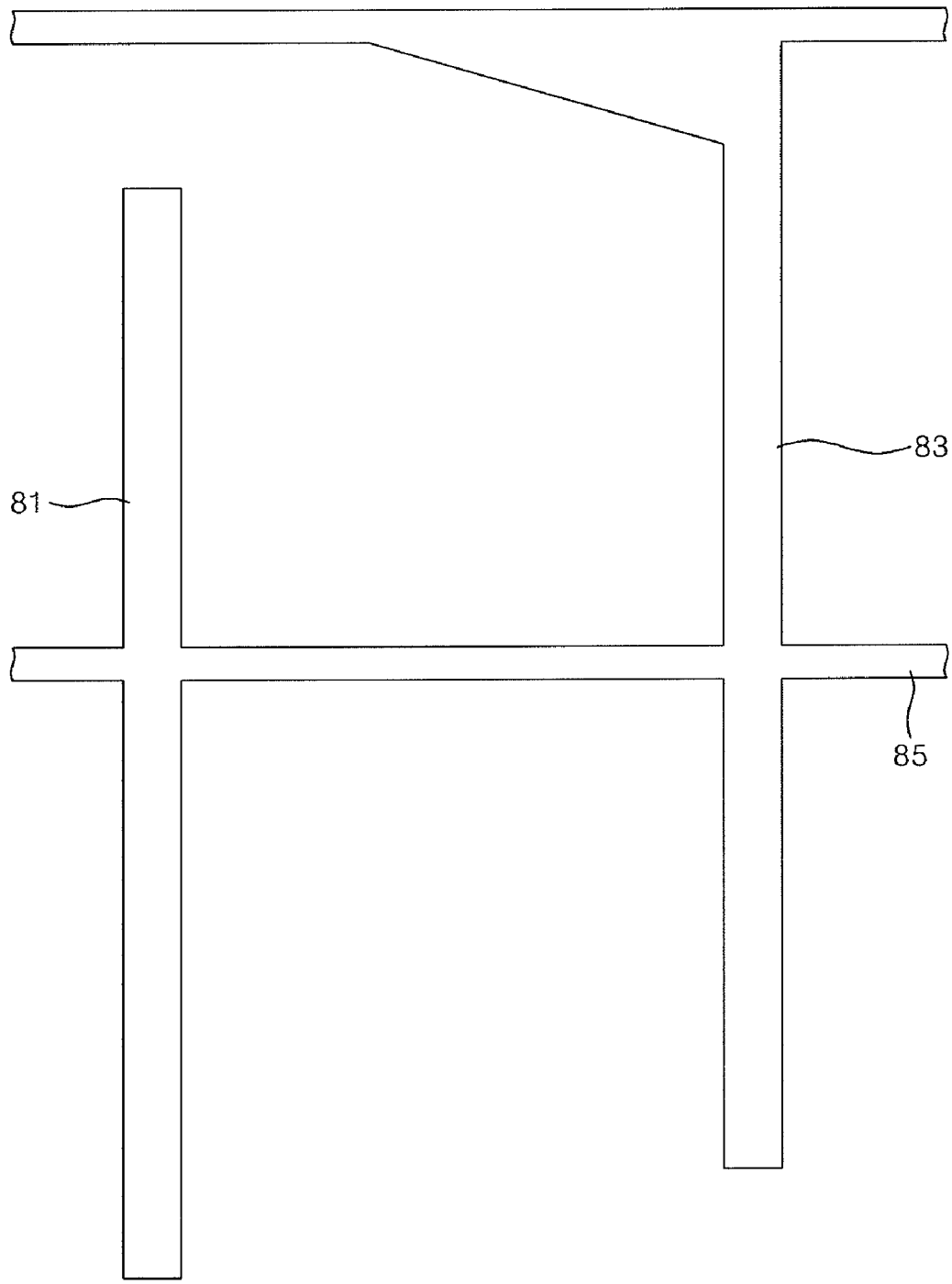
FIG. 4A is a plan view showing a storage pattern of the LCD panel shown in FIG. 1 in accordance with an exemplary embodiment of the present invention.
Figure 4B:
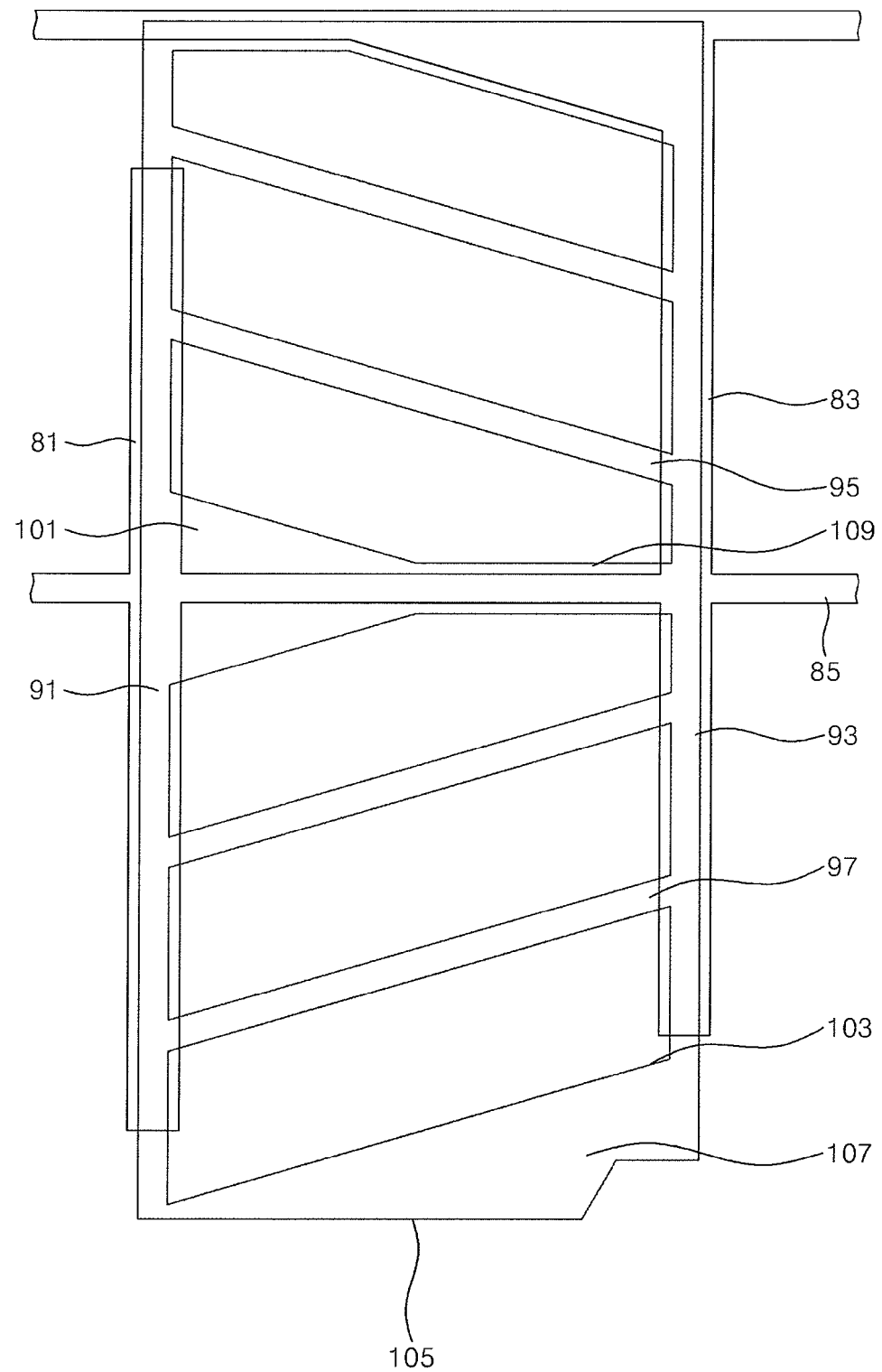
FIG. 4B is a plan view of the pixel electrode pattern shown in FIG. 3 and the storage pattern shown in FIG. 4A.

FIG. 4A is a plan view showing the storage pattern of the LCD panel shown in FIG. 1 in accordance with an exemplary embodiment of the present invention, and FIG. 4B is a plan view of the pixel electrode pattern shown in FIG. 3 and the storage pattern shown in FIG. 4A.

As shown in FIGS. 4A and 4B, the storage pattern includes first and second storage electrodes 81 and 83, and a storage line 85. The storage pattern is formed on the same plane as the gate line 20 and the gate electrode 51 with the same material. In particular, the storage pattern is formed of a metal material in a single layer or in a multi-layer thereof on the first substrate 10. The metal material may include Mo, Nb, Cu, Al, Cr, Ag, W, or an alloy thereof.

Figure 5A:
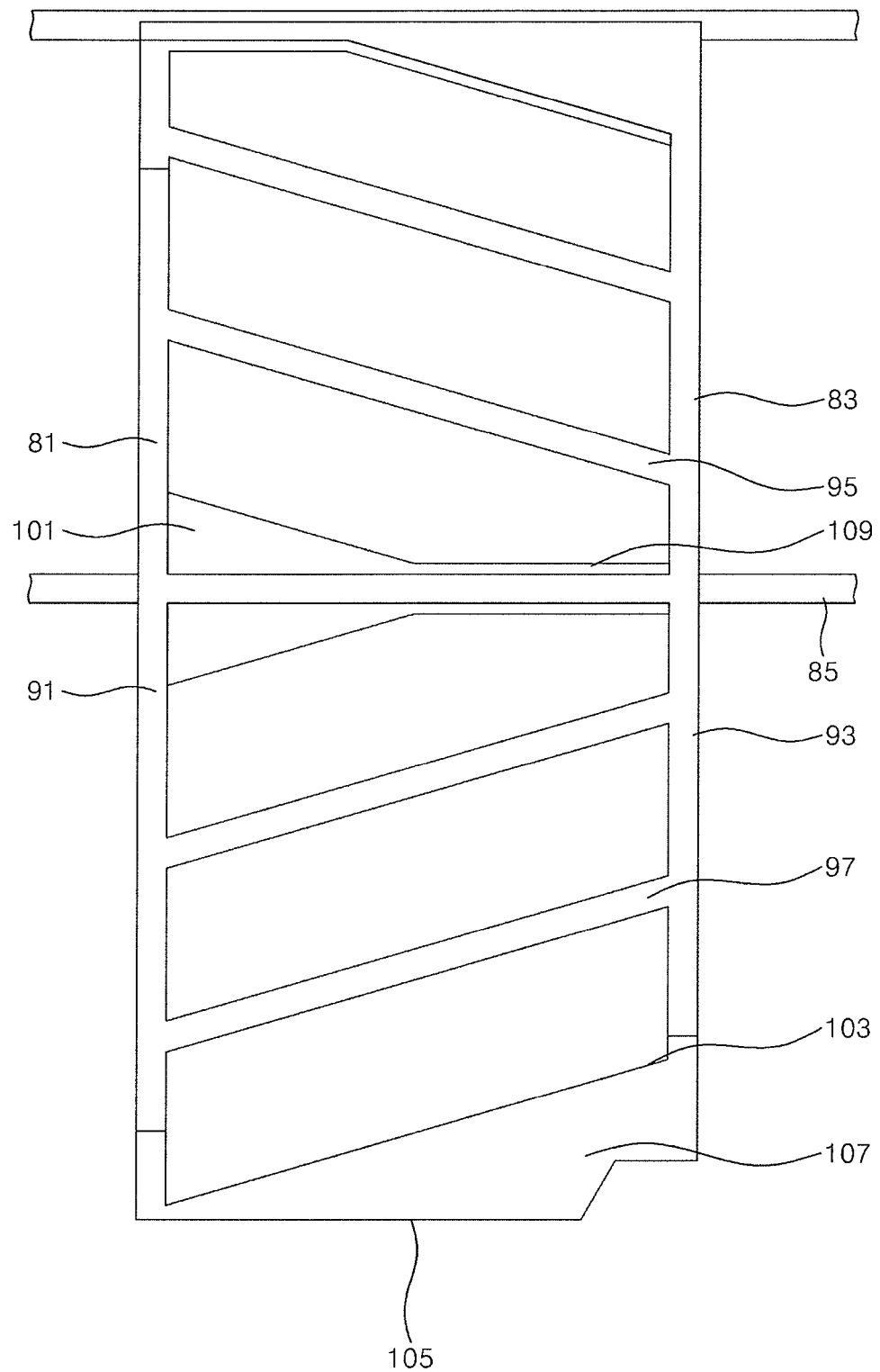
FIG. 5A is a plan view showing a storage pattern and a pixel electrode pattern of an LCD panel in accordance with an exemplary embodiment of the present invention.
Figure 5B:
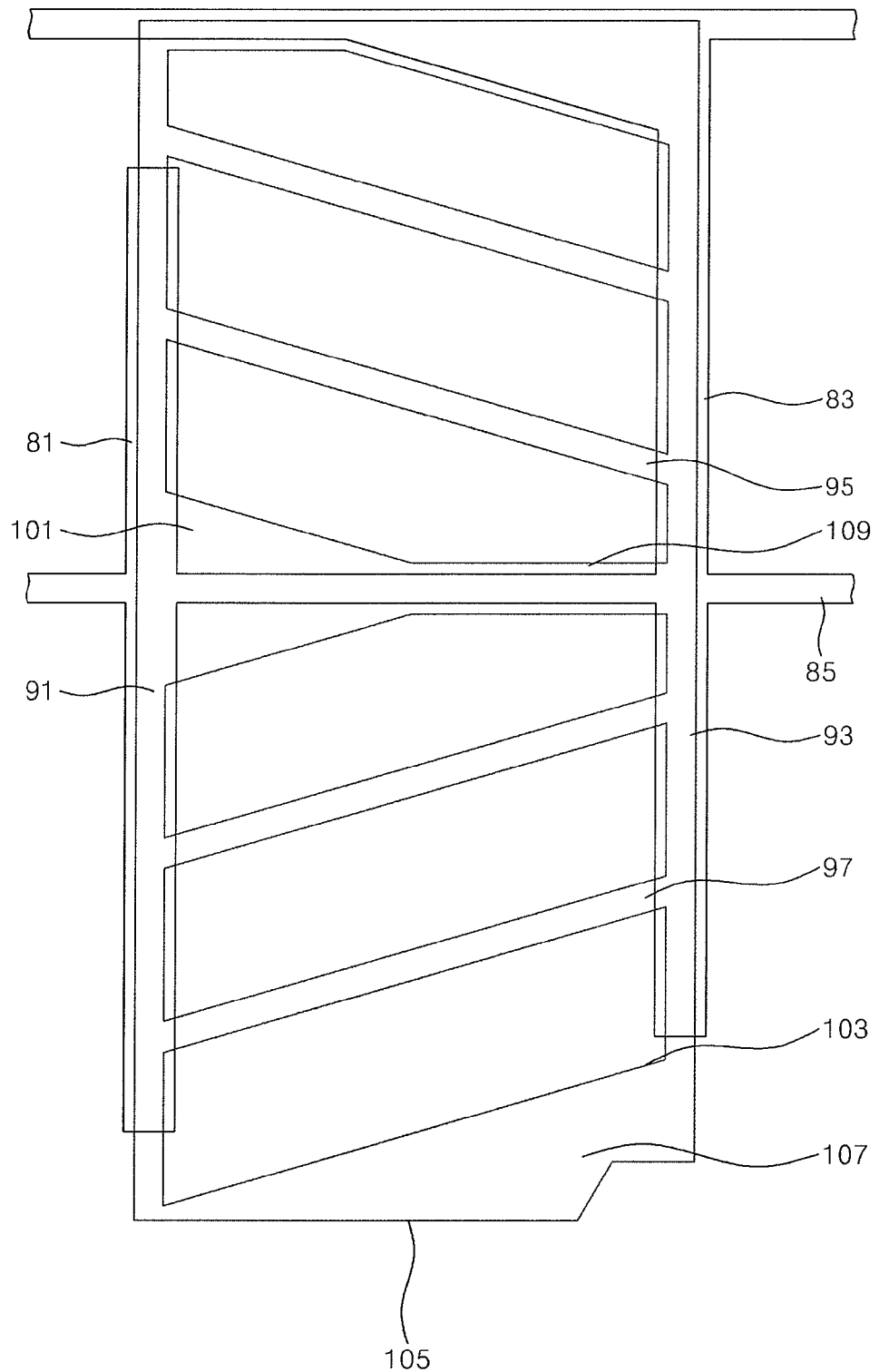
FIG. 5B is a plan view showing a storage pattern and a pixel electrode pattern of an LCD panel in accordance with an exemplary embodiment of the present invention.

The first and second storage electrodes 81 and 83 are formed parallel to the data line 40 in the blocking region. Moreover, the first and second storage electrodes 81 and 83 are formed in parallel with each other, with the storage line 85 interposed therebetween. In particular, the first storage electrode 81 is formed to extend from the storage line 85. The second storage electrode 83 extending from the storage line 85 is formed from the drain electrode 55 to the upper end of the second electrode connection portion 93 and an end of the second storage electrode 83 protrudes therefrom. For example, the second storage electrode 83 may be generally formed in the shape of a reverse 'L'. The lower end of the first storage electrode 81 extends from the storage line 85 to the gate line 20 further than the lower end of the second storage electrode 83 extending to the gate line 20. The first storage electrode 81 is formed parallel to the second storage electrode 83. Meanwhile, as shown in FIG. 5A, the first and second storage electrodes 81 and 83 are formed to have the same widths as the first and second electrode connection portions 91 and 93 of the pixel electrode pattern, respectively. Moreover, as shown in FIG. 5B, the first and second storage electrodes 81 and 83 are formed to have widths larger than those of the first and second electrode connection portions 91 and 93, respectively. The storage pattern and the pixel electrode pattern overlap each other to form a storage capacitor. In more detail, the storage pattern and the pixel electrode pattern overlap each other with the gate insulating layer 30 and the passivation layer 70 interposed therebetween, thus forming the storage capacitor. Accordingly, the capacity of the storage capacitor is increased as the storage pattern and the pixel electrode pattern overlap each other.

The storage line 85 is formed parallel to the gate line 20 in the center of the transmissive region. The storage line 85 is overlapped by the central portion 109 of the pixel electrode pattern. In particular, the storage line 85 is formed to be narrower than the central portion 109. Accordingly, since the widths of the central portion 109 and the storage line 85 are not the same, a step height is not formed and therefore light leakage can be prevented. The storage line 85 is connected to the first storage electrode 81 and the second storage electrode 83. In more detail, the left side of the storage line 85 is connected to the first storage electrode 81 and the right side of the storage line 85 is connected to the second storage electrode 83. For example, the storage line 85 and the first and second storage electrodes 81 and 83 may be generally formed in the shape of an 'H'.

Figure 6A:
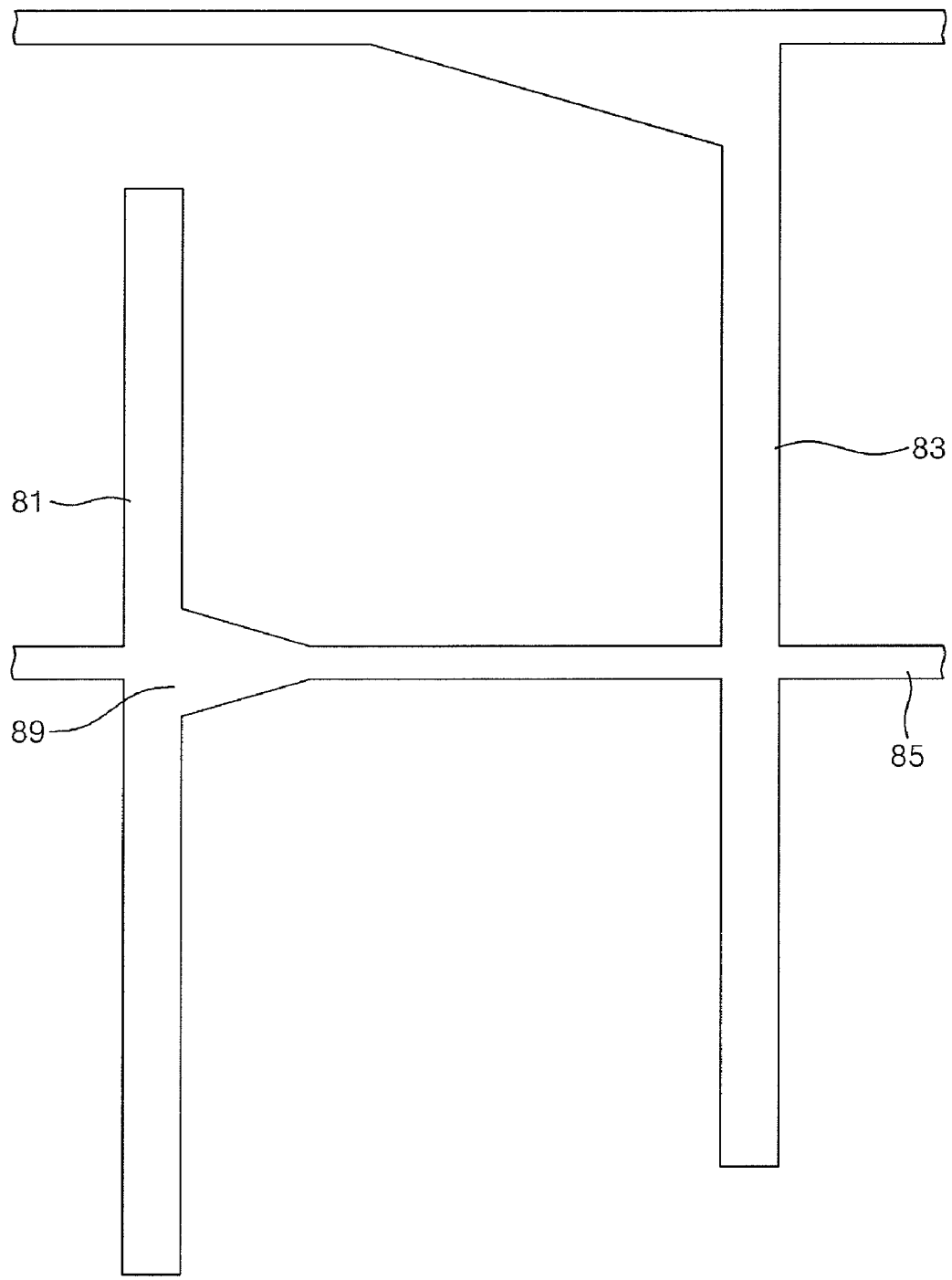
FIG. 6A is a plan view showing a storage pattern of an LCD panel in accordance with an exemplary embodiment of the present invention.
Figure 6B:
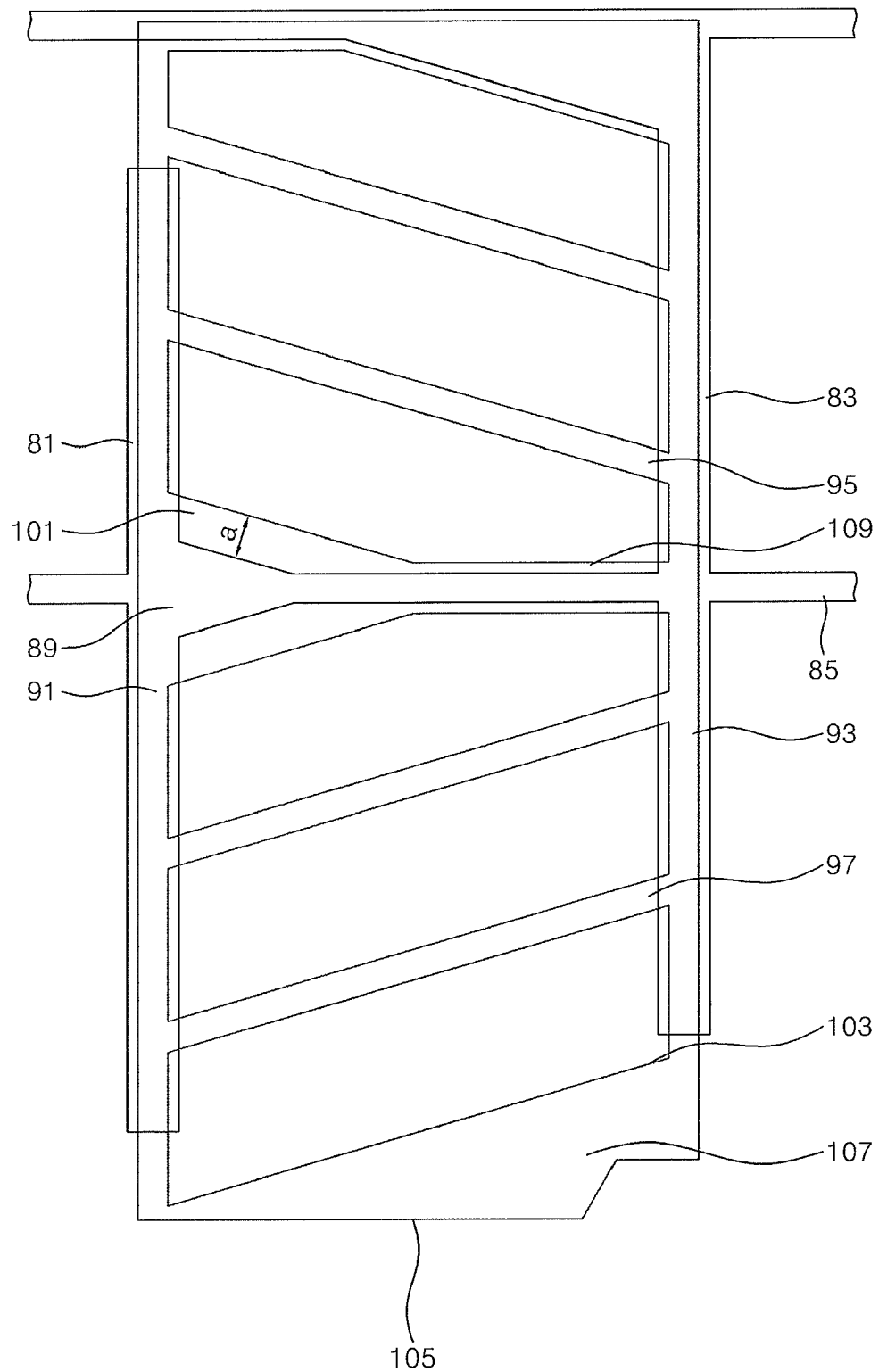
FIG. 6B is a plan view showing the pixel electrode pattern shown in FIG. 3 and the storage pattern shown in FIG. 6A.
Figure 7A:
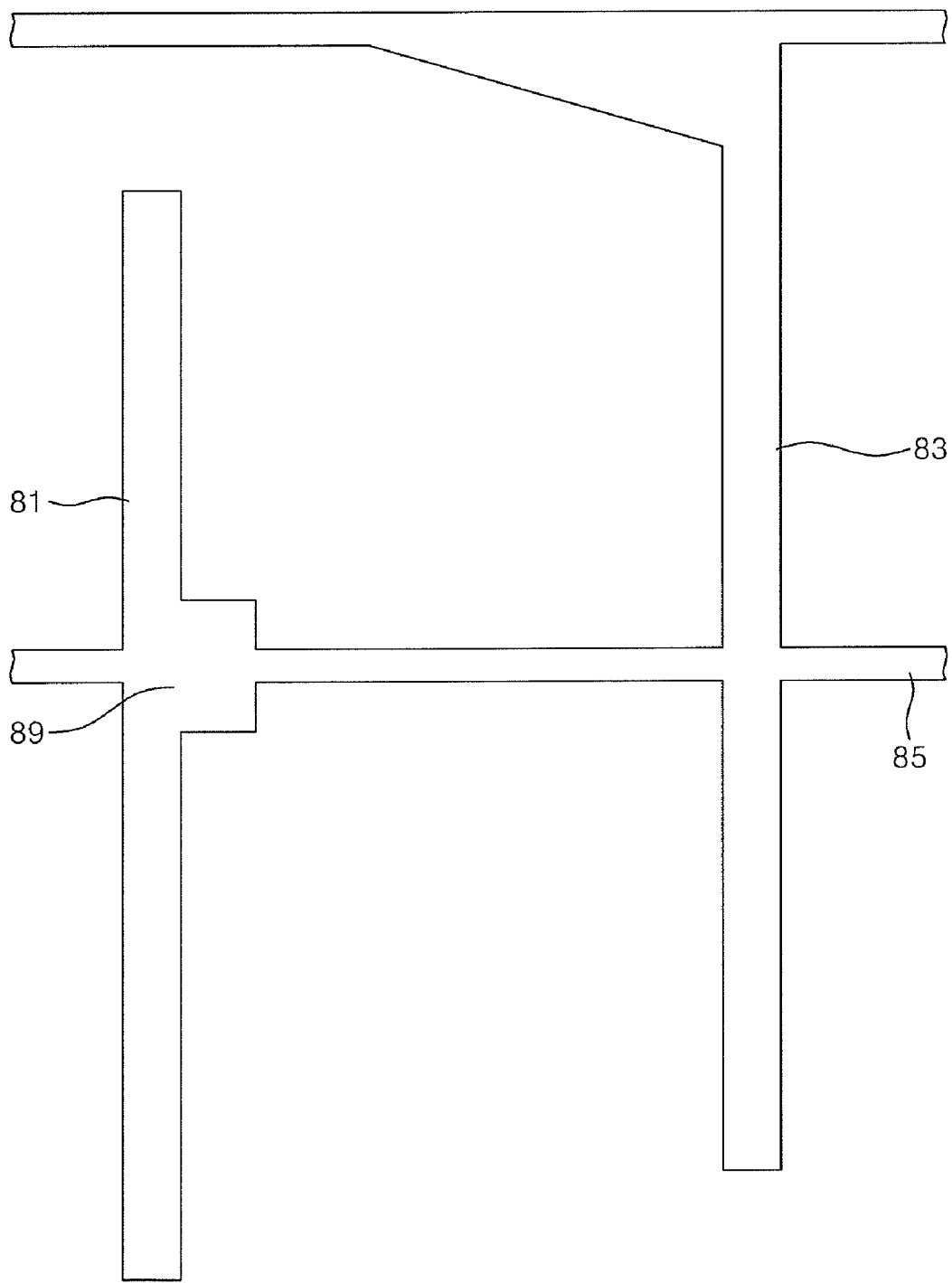
FIG. 7A is a plan view showing a storage pattern of an LCD panel in accordance with an exemplary embodiment of the present invention.
Figure 7B:
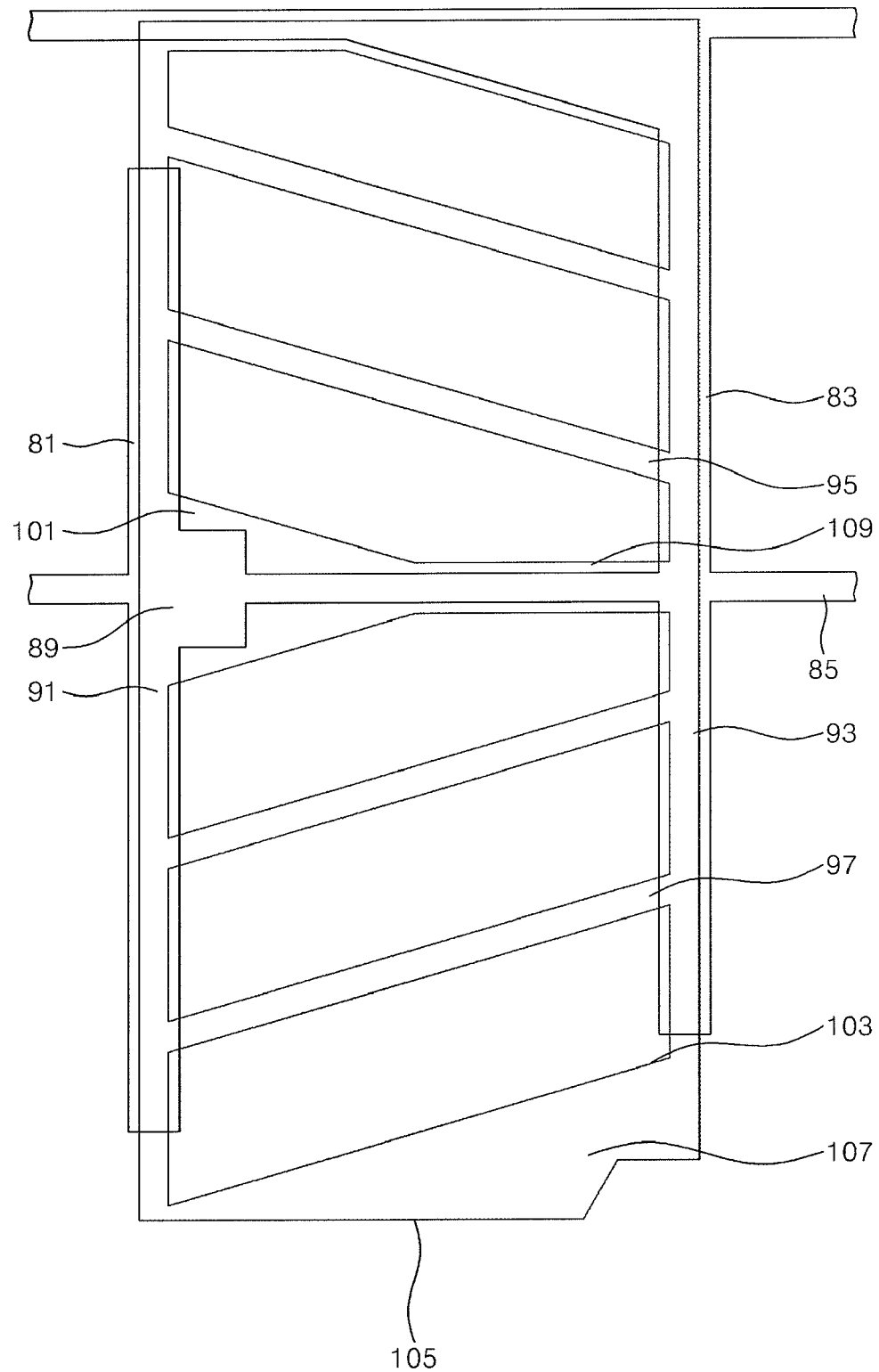
FIG. 7B is a plan view showing the pixel electrode pattern shown in FIG. 3 and the storage pattern shown in FIG. 7A.

FIG. 6A is a plan view showing a storage pattern of an LCD panel in accordance with an exemplary embodiment of the present invention, and FIG. 6B is a plan view showing the pixel electrode pattern shown in FIG. 3 and the storage pattern shown in FIG. 6A. Moreover, FIG. 7A is a plan view showing a storage pattern of an LCD panel in accordance with an exemplary embodiment of the present invention, and FIG. 7B is a plan view showing the pixel electrode pattern shown in FIG. 3 and the storage pattern shown in FIG. 7A.

Referring the FIG. 6A, the storage pattern includes a central storage electrode 89 formed at an intersection between the storage line 85 and the first storage electrode 81. As shown in FIG. 6B, the central storage electrode 89 is overlapped by the central electrode 101 of the pixel electrode pattern. The central storage electrode 89 may be formed about 4 μm apart from the central electrode 101. If the interval 'a' between the central storage electrode 89 and the central electrode 101 is less than about 4 μm, a step height is formed, which results in light leakage. Accordingly, it is preferable that the interval 'a' between the central storage electrode 89 and the central electrode 101 be larger than about 4 μm. The central storage electrode 89 may be formed in the shape of a triangle. Moreover, as shown in FIGS. 7A and 7B, the central storage electrode 89 may be formed in the shape of a quadrangle. Accordingly, since a step height is not formed by the central storage electrode 89 and the central electrode 101, light leakage can be prevented. Although the above description has been made for the case where the central storage electrode 89 has a triangular or quadrangular shape, the description is not limited thereto. For example, the central storage electrode 89 may be formed in any shape as long as the interval 'a' between the central storage electrode 89 and the central electrode 101 is larger than about 4 μm.

Referring back to FIGS. 1, 2A, and 2B, the opposing substrate includes a second substrate 150, a black matrix 160, a color filter 170, a planarization layer 180, and a common electrode pattern 190.

The second substrate 150 includes a transmissive region for transmitting light and a blocking region for blocking light. It is desirable that the second substrate 150 be formed of an insulating material such as glass or plastic.

The black matrix 160 is formed in a matrix shape in the blocking region of the second substrate 150 to define a plurality of pixels in which the color filter 170 is formed. Moreover, the black matrix 160 is formed to overlap the gate line 20, the data line 40 and the TFT 50 on the TFT substrate. The black matrix 160 shields light generated by an undesirable orientation of the liquid crystal 200 to improve the contrast of the LCD panel. Moreover, the black matrix 160 intercepts direct light irradiation to the TFT 50 to prevent the generation of light leakage by the TFT 50. For this, the black matrix 160 is formed of an opaque metal or opaque polymer resin.

The color filter 170 includes red (R), green (G) and blue (B) color filters 170 to reproduce colors. The respective R, G and B color filters 170 absorb or transmit light of a specific wavelength through R, G and B pigments included therein, thus displaying R, G and B colors. In this case, the R, G and B color filters 170 display various colors by an additive mixture of R, G and B lights passed through the R, G and B color filters 170. The color filters 170 are arranged in a stripe shape where the R, G and B color filters 170 are arranged in a row.

The planarization layer 180 is formed on the color filters 170 and the black matrix 160 to planarize the surface of the color filters 170.

The common electrode pattern 190 is formed on the planarization layer 180. The common electrode pattern 190 is formed between the plurality of linear pixel electrodes 95 and 97 formed on the TFT substrate and thereby fringe electric fields are generated. The liquid crystal molecules 200 are driven symmetrically with respect to the linear pixel electrodes 95 and 97 using the fringe electric fields to form a multi-domain structure. The common electrode pattern 190 is formed of a transparent conductive material such as ITO, TO, IZO, and ITZO.

The liquid crystal molecules 200 are rotated by a difference between a pixel voltage from the pixel electrode pattern and a common voltage from the common electrode pattern 190 of the opposing substrate to control the transmittance of light emitted from the backlight assembly. To this end, the liquid crystal 200 is made of a material having dielectric anisotropy and refractive anisotropy.

Figure 8:
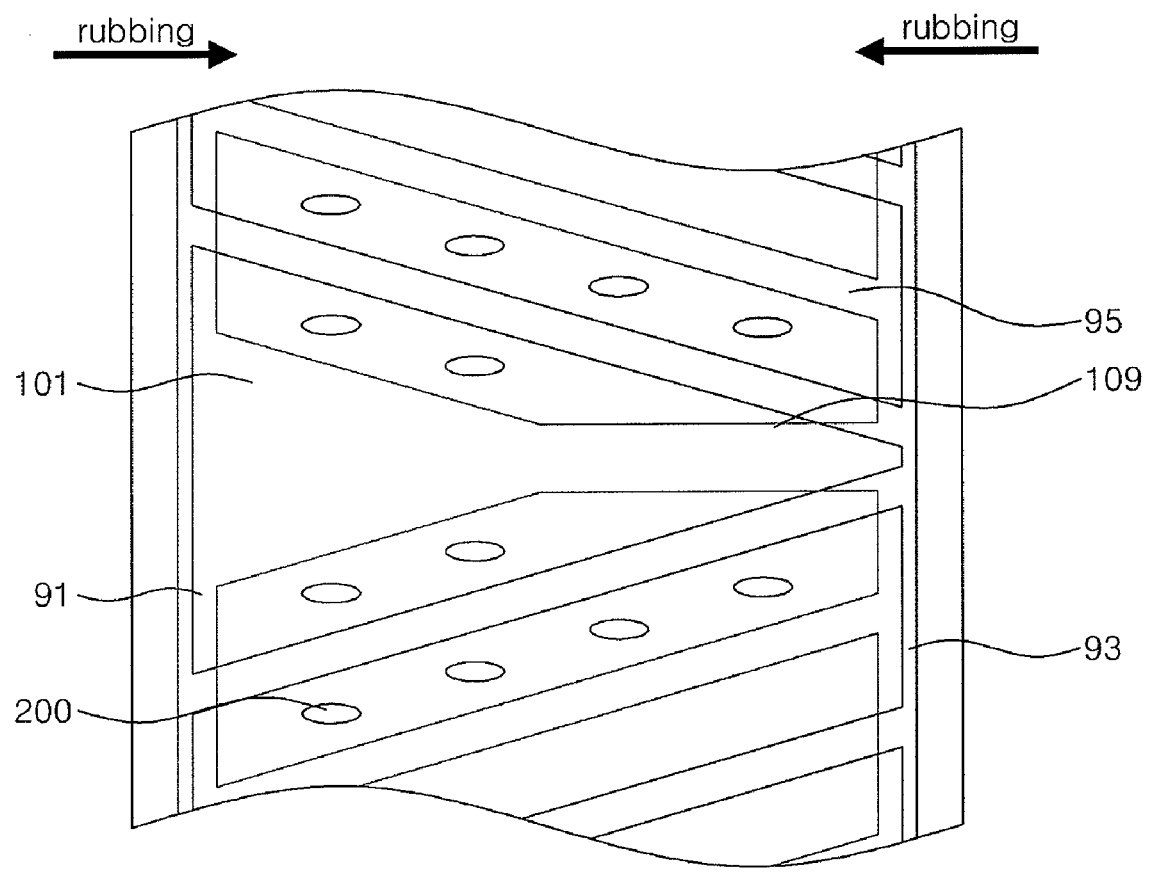
FIG. 8 is a plan view illustrating an orientation of a liquid crystal when a voltage is not applied to the LCD panel shown in FIG. 1 in accordance with an exemplary embodiment of the present invention.
Figure 9:
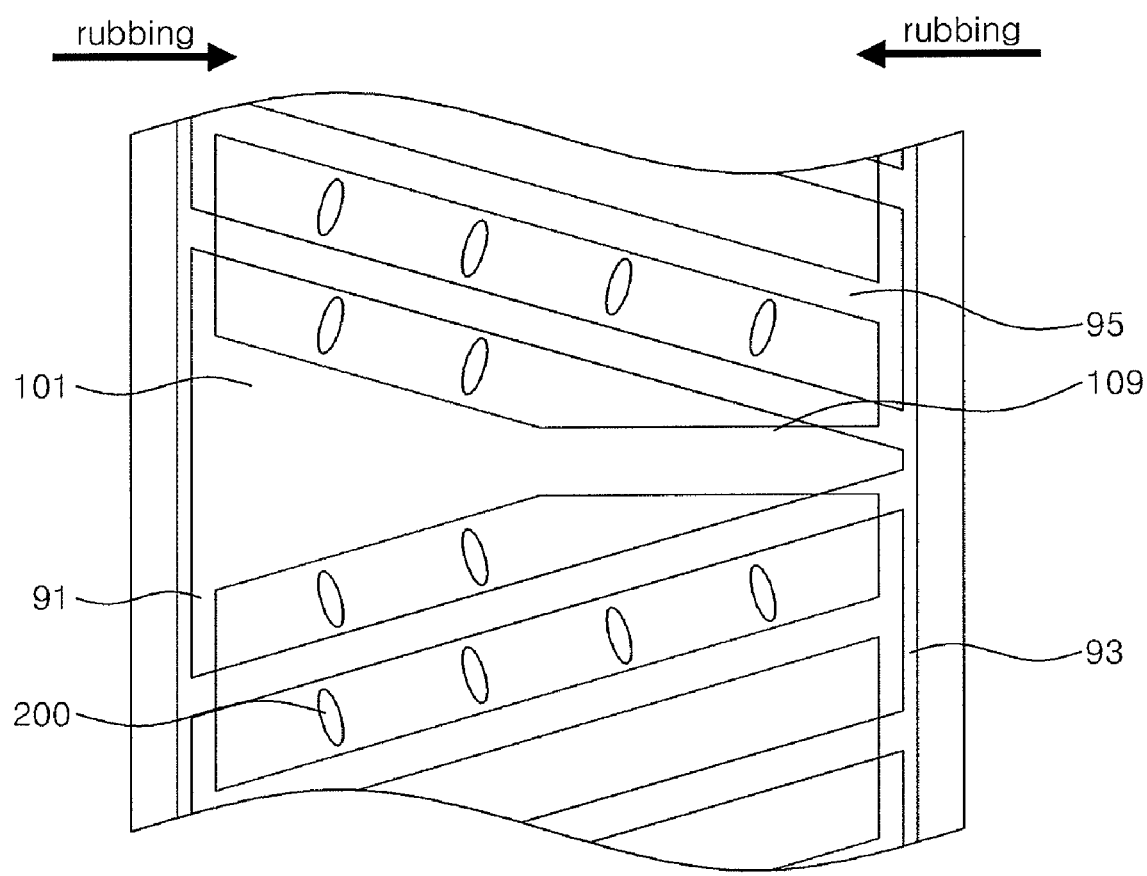
FIG. 9 is a plan view illustrating an orientation of a liquid crystal when a voltage is applied to the LCD panel shown in FIG. 1 in accordance with an exemplary embodiment of the present invention.

In a dual field switching (DFS) mode, a liquid crystal 200 having a positive or negative dielectric anisotropy is aligned horizontally and driven horizontally or vertically to the electric field direction, thus controlling light transmittance. Moreover, a horizontal alignment layer is formed on the upper portion of the first and second substrates 10 and 150. In the following, a description will be given with respect to the liquid crystal 200 having a positive dielectric anisotropy. As shown in FIG. 8, when a voltage is not applied to the LCD panel, the liquid crystal molecules 200 are oriented at an angle of about 10° to about 30° with respect to the linear pixel electrodes 95 and 97 and the common electrode pattern 190. As shown in FIG. 9, when a voltage is applied to the LCD panel, the liquid crystal molecules 200 are aligned perpendicularly to the linear pixel electrodes 95 and 97 and the common electrode pattern 190. In this case, only typical liquid crystal molecules 200 are depicted in FIG. 9 to illustrate that the state of the liquid crystal molecules 200 is varied when the voltage is applied to the LCD panel.

Next, a method of manufacturing a TFT substrate in an LCD panel in accordance with an exemplary embodiment of the present invention will be described in detail with reference to FIGS. 10 to 19B.

Figure 10:
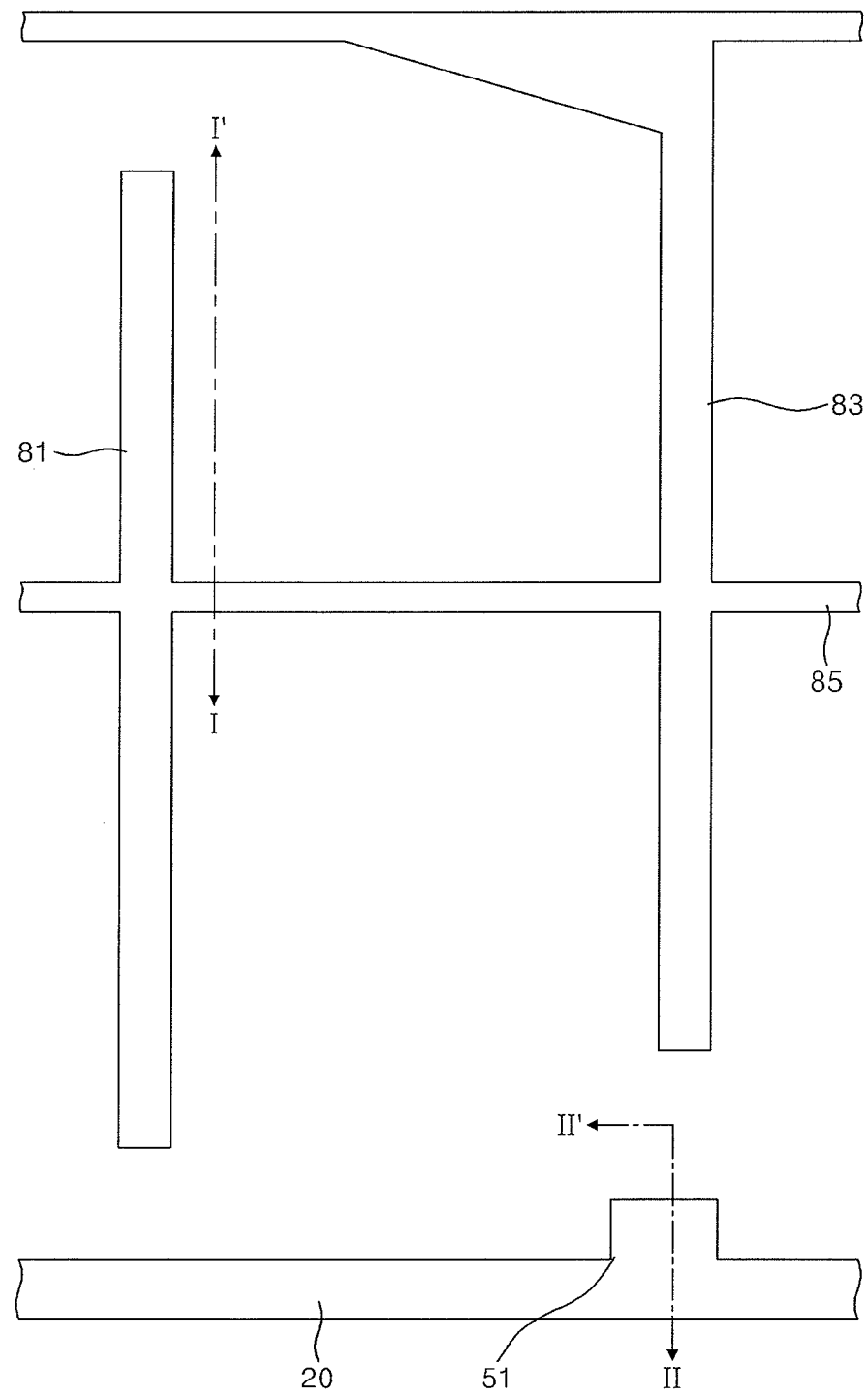
FIG. 10 is a plan view and FIGS. 11A, and 11B are cross-sectional views taken along lines I-I' and II-II' of FIG. 10, respectively, illustrating a first mask process of a method of manufacturing a thin film transistor (TFT) substrate in an LCD panel in accordance with an exemplary embodiment of the present invention.
Figure 11A:
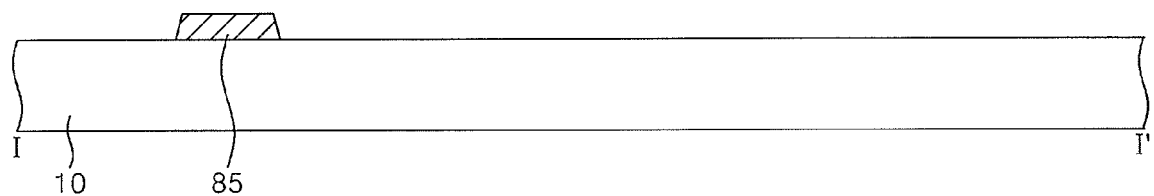
Figure 11B:
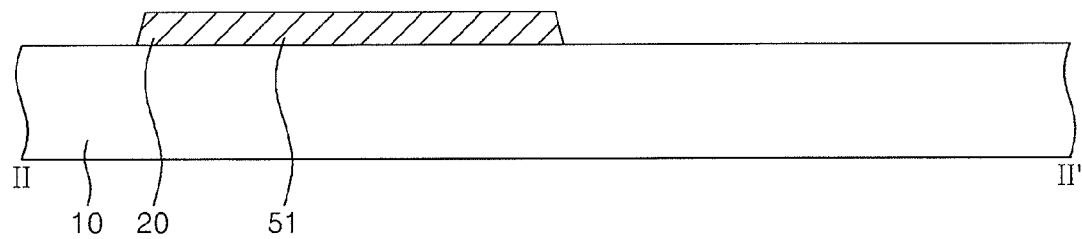

FIG. 10 is a plan view and FIGS. 11A and 11B are cross-sectional views taken along lines I-I' and II-II' of FIG. 10, respectively, illustrating a first mask process of a method of manufacturing a TFT substrate in an LCD panel in accordance with an exemplary embodiment of the present invention.

Referring to FIGS. 10, 11A, and 11B, a gate metal pattern including a gate line 20, a gate electrode 51 and a storage pattern is formed on an insulated first substrate 10 by a first mask process. In other words, a gate metal layer is formed on the insulated first substrate 10 by a deposition method such as sputtering. The gate metal layer is formed of a metal material in a single layer or in a multi-layer thereof. The metal material may include Mo, Nb, Cu, Al, Cr, Ag, W, or an alloy thereof. Subsequently, the gate metal layer is patterned by photolithography and etching processes using a first mask, thus forming the gate metal pattern including the gate line 20, the gate electrode 51 and the storage pattern.

Figure 12:
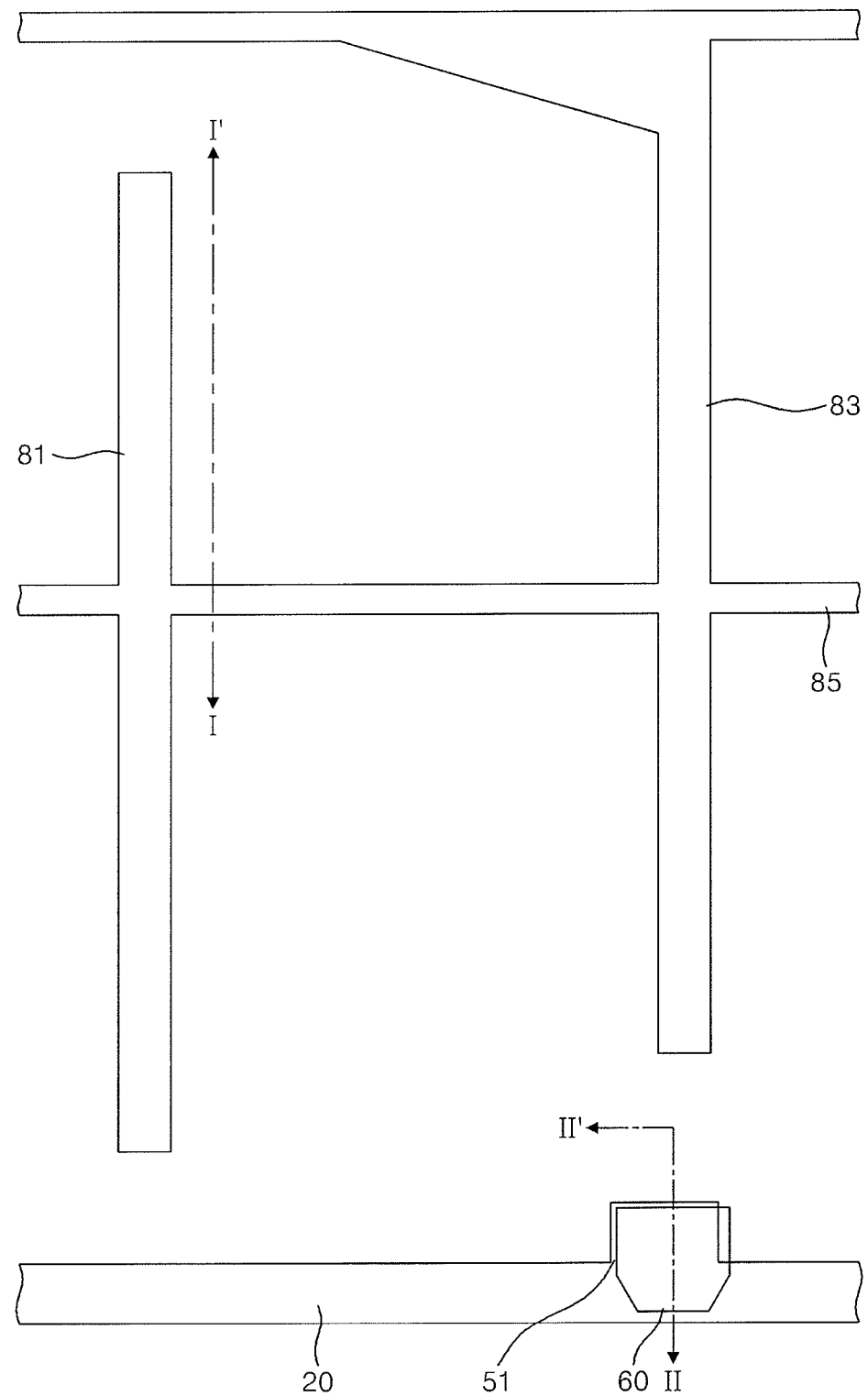
FIG. 12 is a plan view and FIGS. 13A, and 13B are cross-sectional views taken along lines I-I' and II-II' of FIG. 12, respectively, illustrating a second mask process of the method of manufacturing the TFT substrate in the LCD panel in accordance with an exemplary embodiment of the present invention.
Figure 13A:
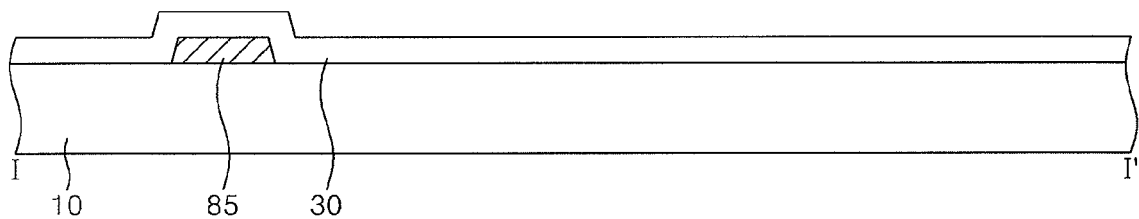
Figure 13B:
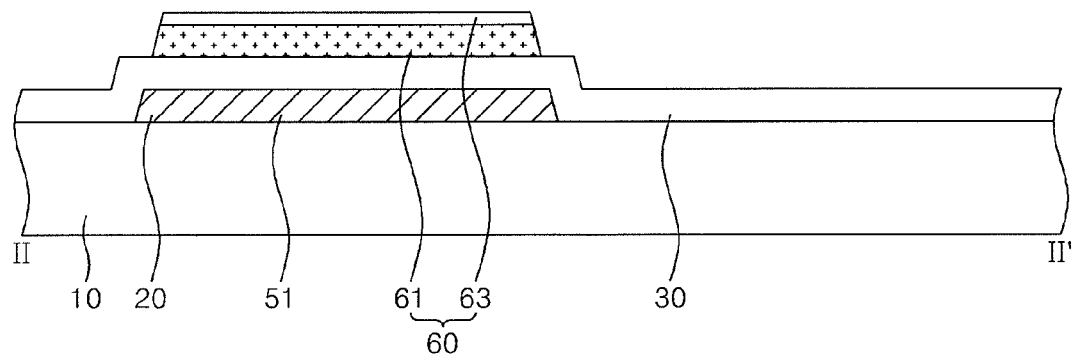

FIG. 12 is a plan view and FIGS. 13A, and 13B are cross-sectional views taken along lines I-I' and II-II' of FIG. 12, respectively, illustrating a second mask process of the method of manufacturing the TFT substrate in the LCD panel in accordance with an exemplary embodiment of the present invention.

Referring to FIGS. 12, 13A, and 13B, a gate insulating layer 30 is formed on the gate metal pattern including the gate line 20, the gate electrode 51 and the storage pattern, and a semiconductor pattern 60 including an activation layer 61 and an ohmic contact layer 63 is formed on the gate insulating layer 30.

The gate insulating layer 30, an amorphous silicon layer, and an impurity-doped amorphous silicon layer are formed in sequence on the gate metal pattern by a deposition method such as plasma-enhanced chemical vapor deposition (PECVD). The gate insulating layer 30 is formed of an inorganic insulating material such as silicon oxide (SiOx) or silicon nitride (SiNx). Subsequently, the amorphous silicon layer and the impurity-doped amorphous silicon layer are patterned by photolithography and etching processes using a second mask, thus forming the semiconductor pattern 60 including the activation layer 61 and the ohmic contact layer 63.

Figure 14:
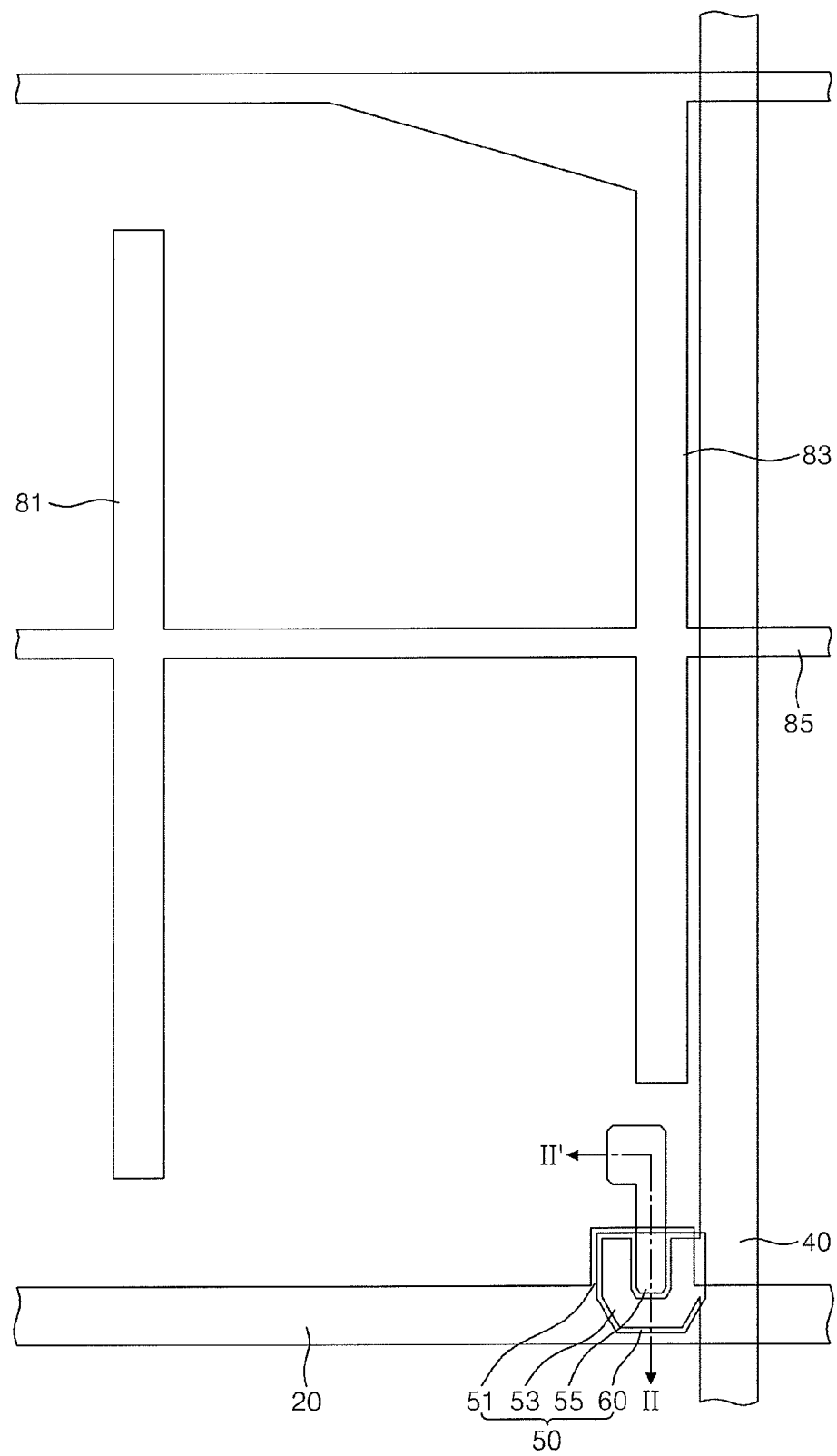
FIG. 14 is a plan view and FIG. 15 is a cross-sectional view taken along line II-II' of FIG. 14 illustrating a third mask process of the method of manufacturing the TFT substrate in the LCD panel in accordance with an exemplary embodiment of the present invention.
Figure 15:
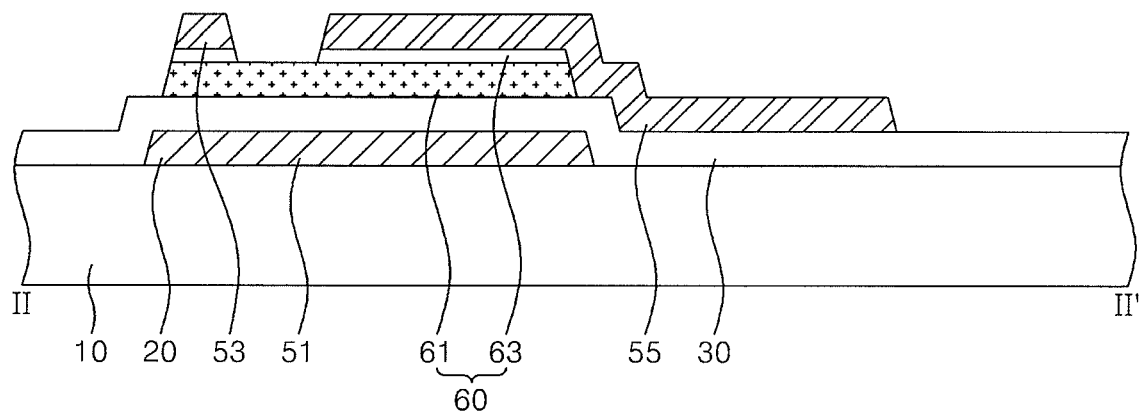

FIG. 14 is a plan view and FIG. 15 is a cross-sectional view taken along line II-II' of FIG. 14 illustrating a third mask process of the method of manufacturing the TFT substrate in the LCD panel in accordance with an exemplary embodiment of the present invention.

Referring to FIGS. 14 and 15, a data metal pattern including a data line 40, a source electrode 53 and a drain electrode 55 is formed on the semiconductor pattern 60 and the gate insulating layer 30.

More specifically, a data metal layer is formed on the semiconductor pattern 60 and the gate insulating layer 30 by a deposition method such as sputtering. The data metal layer is formed of a metal material in a single layer or in a multi-layer thereof. The metal material may include Mo, Nb, Cu, Al, Cr, Ag, W, or an alloy thereof. Subsequently, the data metal layer is patterned by photolithography and etching processes using a third mask, thus forming the data metal pattern including the data line 40, the source electrode 53 and the drain electrode 55. Then, the ohmic contact layer 63 exposed between the source electrode 53 and the drain electrode 55 is removed using a third mask to expose the activation layer 61. The semiconductor pattern 60 and the data metal pattern including the data line 40, the source electrode 53 and the drain electrode 55 may be formed by one mask process using a diffractive exposure mask or a half-tone mask.

Figure 16:
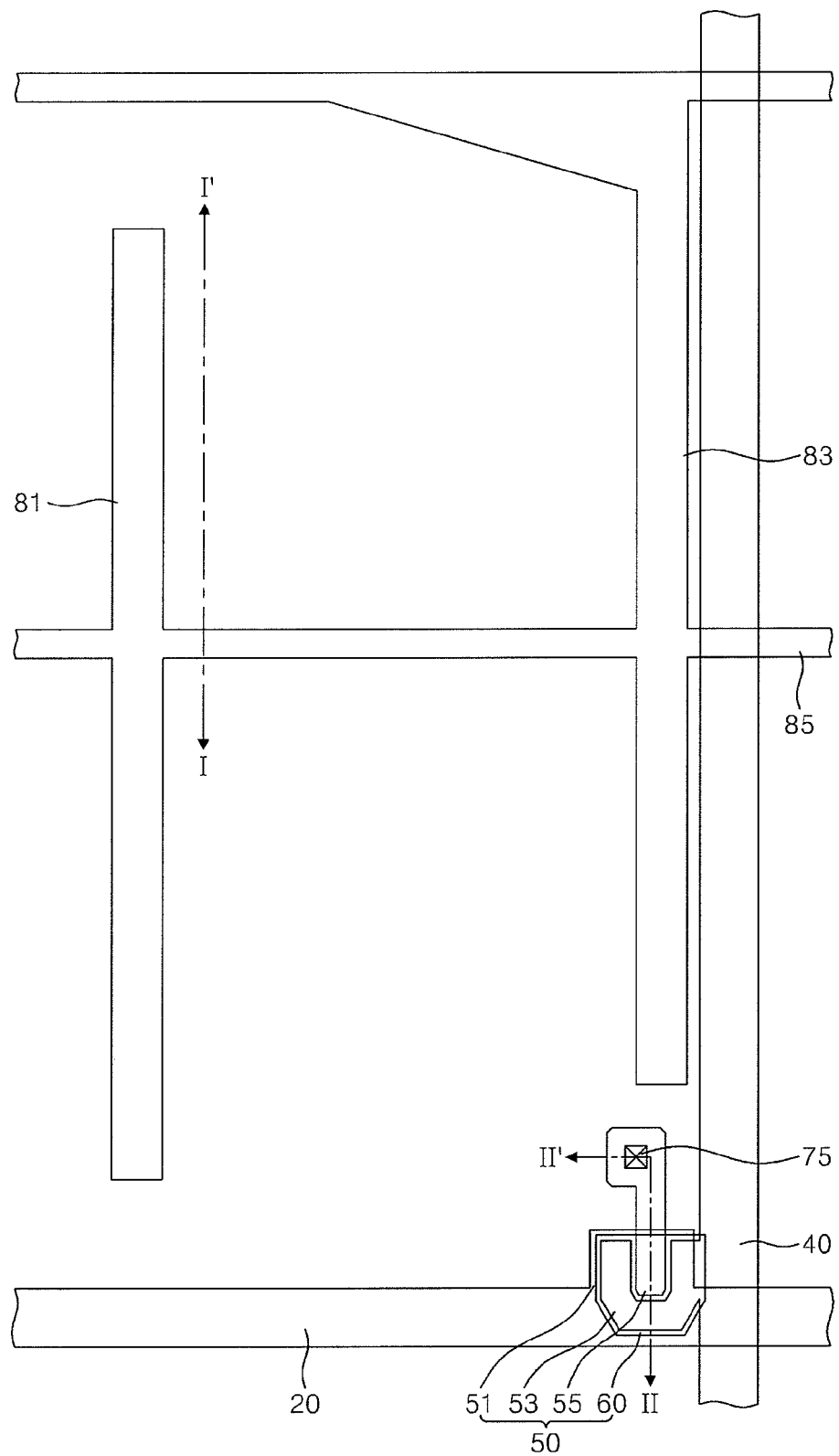
FIG. 16 is a plan view and FIGS. 17A, and 17B are cross-sectional views taken along lines I-I' and II-II' of FIG. 16, respectively, illustrating a fourth mask process of the method of manufacturing the TFT substrate in the LCD panel in accordance with an exemplary embodiment of the present invention.
Figure 17A:
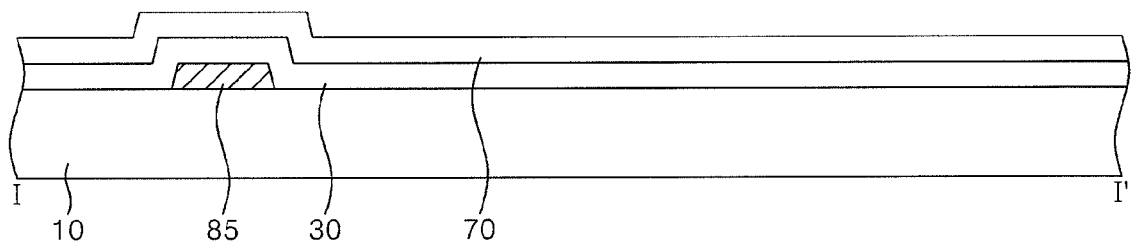
Figure 17B:
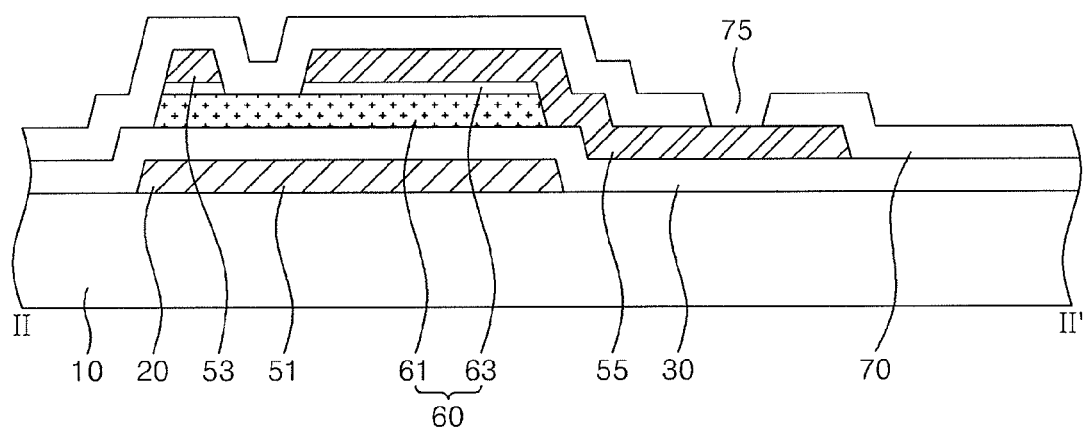

FIG. 16 is a plan view and FIGS. 17A, and 17B are cross-sectional views taken along lines I-I' and II-II' of FIG. 16, respectively, illustrating a fourth mask process of the method of manufacturing the TFT substrate in the LCD panel in accordance with an exemplary embodiment of the present invention.

Referring to FIGS. 16, 17A, and 17B, a passivation layer 70 including a contact hole 75 is formed on the data metal pattern and the gate insulating layer 30 by a deposition process such as PECVD. The passivation layer 70 is formed of the same inorganic insulating material as the gate insulating layer 30. Subsequently, the passivation layer 70 is patterned by photolithography and etching processes using a fourth mask, thus forming the contact hole 75 exposing the drain electrode 55.

Figure 18:
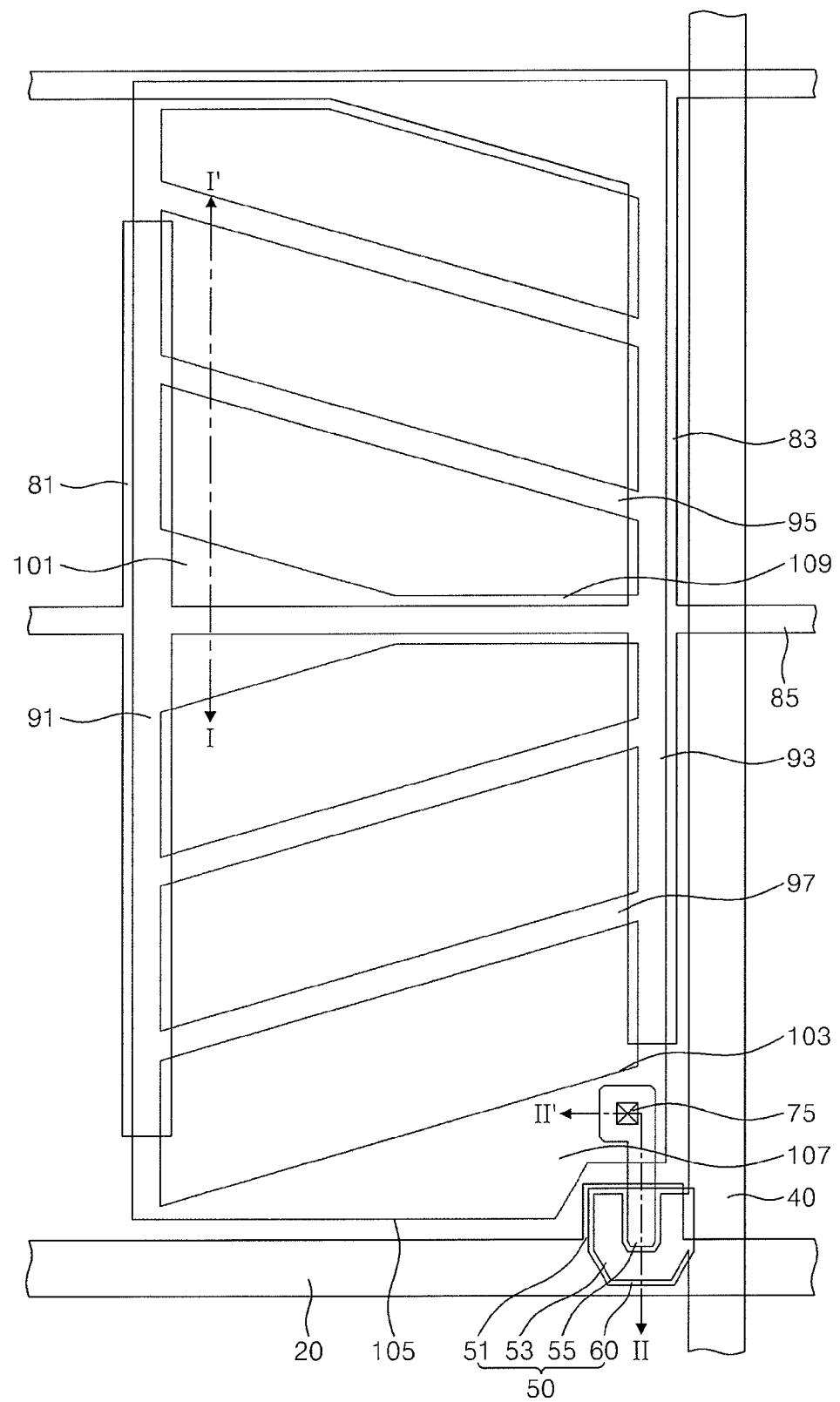
FIG. 18 is a plan view and FIGS. 19A, and 19B are cross-sectional views taken along lines I-I' and II-II' of FIG. 18, respectively, illustrating a fifth mask process of the method of manufacturing the TFT substrate in the LCD panel in accordance with an exemplary embodiment of the present invention.
Figure 19A:
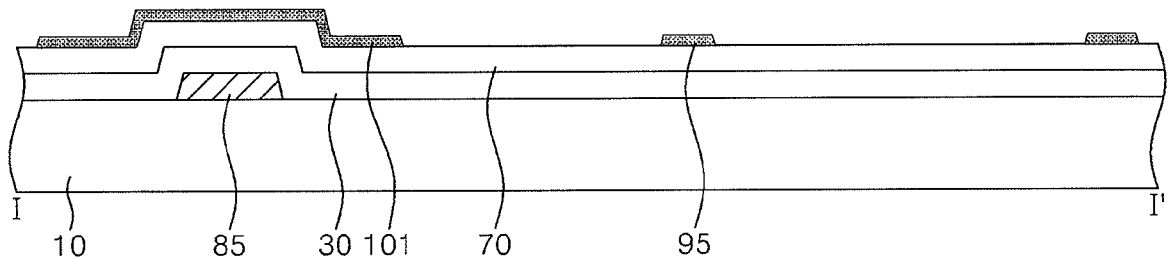
Figure 19B:
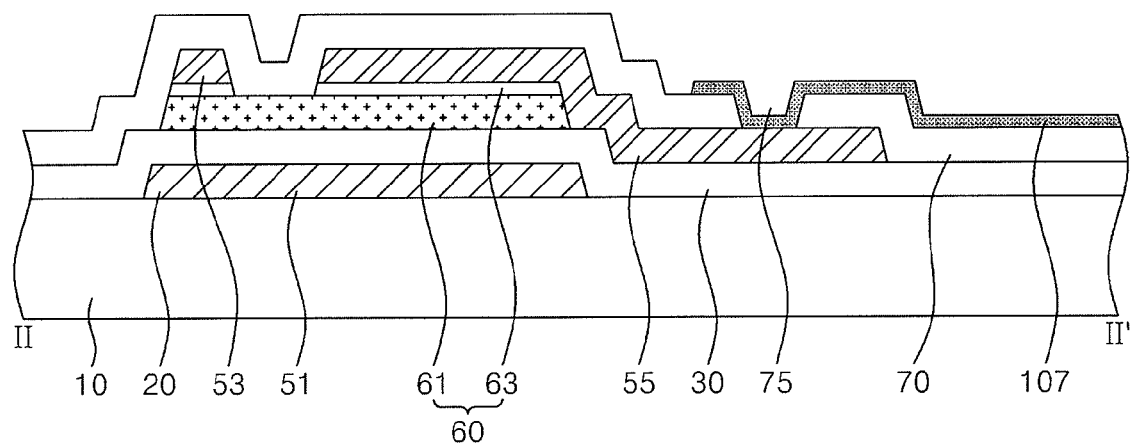

FIG. 18 is a plan view and FIGS. 19A, and 19B are cross-sectional views taken along lines I-I' and II-II' of FIG. 18, respectively, illustrating a fifth mask process of the method of manufacturing the TFT substrate in the LCD panel in accordance with an exemplary embodiment of the present invention.

Referring to FIGS. 18, 19A, and 19B, a pixel electrode pattern is formed on the passivation layer 70. In other words, a transparent conductive layer is formed on the passivation layer 70 by a deposition method such as sputtering. The transparent conductive layer is formed of a transparent and conductive material such as ITO, TO, IZO, and ITZO. Subsequently, the transparent conductive layer is patterned by photolithography and etching processes using a fifth mask, thus forming the pixel electrode pattern. A texture prevention portion 107 of the pixel electrode pattern is connected to the drain electrode 55 exposed by the contact hole 75 penetrating the passivation layer 70.

As described above, in the LCD panel according to an exemplary embodiment of the present invention, the storage pattern is overlapped by the pixel electrode pattern in the transmissive region. In detail, since the storage line of the storage pattern and the central storage electrode of the storage pattern are overlapped by the central portion of the pixel electrode pattern and the central electrode of the pixel electrode pattern, respectively, a step height is not formed and therefore light leakage can be prevented. Moreover, with the texture prevention portion formed to control the liquid crystal, the generation of texture on the LCD panel can be prevented.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A liquid crystal display (LCD) panel, comprising:
   a first base substrate;
   a plurality of gate lines and a plurality of data lines disposed on the first base substrate and crossing each other;
   a pixel electrode pattern disposed on the first base substrate, the pixel electrode pattern comprising,
     a first electrode connection portion and a second connection portion arranged in parallel with each other,
     a first linear pixel electrode and a second linear pixel electrode arranged between the first electrode connection portion and the second electrode connection portion,
     a central electrode arranged between the first linear pixel electrode and the second linear pixel electrode, and
     a central portion connected to the central electrode, wherein the first linear pixel electrode and the second linear pixel electrode are inclined in a different direction from each other with respect to the gate lines, and the central electrode is formed in a substantially triangular shape;
   a storage pattern disposed on the first base substrate, the storage pattern being positioned between consecutive gate lines and substantially in parallel with the gate lines, wherein the storage pattern is a lower electrode of a storage capacitor;

a second base substrate;

a common electrode disposed on the second base substrate and alternately positioned with the pixel electrode; and a liquid crystal layer disposed between the first and second base substrates.

2. The LCD panel of claim 1, wherein the storage pattern comprises:

a first storage electrode and a second storage electrode formed at positions corresponding to the first and second electrode connection portions, respectively; and a storage line formed at a position corresponding to the central portion of the pixel electrode pattern and connected to the first storage electrode and the second storage electrode.

3. The LCD panel of claim 1, wherein the storage pattern comprises:

a first storage electrode and a second storage electrode formed at positions corresponding to the first and second electrode connection portions, respectively; and a central storage electrode formed at an intersection between the first storage electrode and the storage line, wherein the central storage electrode is formed in a linear shape.

4. The LCD panel of claim 3, wherein the central storage electrode is formed in a substantially quadrangular shape.

5. The LCD panel of claim 3, wherein the central storage electrode is formed in a substantially rectangular shape.

6. The LCD panel of claim 3, wherein the central storage electrode is formed about 4 μm apart from the central electrode.

7. The LCD panel of claim 6, wherein the central storage electrode is formed in a substantially triangular shape.

8. The LCD panel of claim 2, wherein the first and second storage electrodes are formed to have substantially the same or wider widths as or than the first and second electrode connection portions, respectively.

9. The LCD panel of claim 3, wherein the first and second storage electrodes are formed to have substantially the same or wider widths as or than the first and second electrode connection portions, respectively.

10. The LCD panel of claim 1, wherein the first and second linear pixel electrodes are formed obliquely with respect to the central portion of the pixel electrode pattern.

11. The LCD panel of claim 10, wherein the pixel electrode pattern is formed to overlap the TFT and comprises a texture prevention portion connected to the first and second electrode connection portions.

12. The LCD panel of claim 11, wherein the texture prevention portion is formed in a substantially triangular shape, wherein one side of the texture prevention portion is formed parallel to the second linear pixel electrode and another side of the texture prevention portion is formed parallel to the gate line.

13. The LCD panel of claim 11, wherein the texture prevention portion is connected to the TFT.

14. The LCD panel of claim 2, wherein the storage line is formed of the same material as the gate line.

15. The LCD panel of claim 2, wherein the storage line is formed on the same plane as the gate line.

16. The LCD panel of claim 1, wherein the pixel electrode pattern is formed of a transparent conductive material.

17. The LCD panel of claim 1, wherein the second substrate comprises:

a transmissive region and a blocking region;

a black matrix provided in the blocking region; and a color filter provided in the transmissive region.

18. The LCD panel of claim 1, wherein the first linear pixel electrode is provided in plurality and the plurality of first linear pixel electrodes are spaced at regular intervals, and the second linear pixel electrode is provided in plurality and the plurality of second linear pixel electrodes are spaced at regular intervals.

* * * * *